(12) United States Patent
Sawano

(10) Patent No.: US 12,202,420 B2
(45) Date of Patent: Jan. 21, 2025

(54) BUMPER ATTACHMENT RETAINER

(71) Applicant: Nifco Inc., Kanagawa (JP)

(72) Inventor: Kota Sawano, Kanagawa (JP)

(73) Assignee: Nifco Inc., Yokosuka (JP)

( * ) Notice: Subject to any disclaimer, the term of this patent is extended or adjusted under 35 U.S.C. 154(b) by 455 days.

(21) Appl. No.: 17/614,575

(22) PCT Filed: May 7, 2020

(86) PCT No.: PCT/JP2020/018583
§ 371 (c)(1),
(2) Date: Nov. 29, 2021

(87) PCT Pub. No.: WO2020/241197
PCT Pub. Date: Dec. 3, 2020

(65) Prior Publication Data
US 2022/0227320 A1 Jul. 21, 2022

(30) Foreign Application Priority Data

May 30, 2019 (JP) .................................. 2019-101503

(51) Int. Cl.
*B60R 19/24* (2006.01)
(52) U.S. Cl.
CPC ................................... *B60R 19/24* (2013.01)
(58) Field of Classification Search
CPC ....... B60R 19/24; B60R 19/023; B60R 19/18; B60R 19/26; B60R 19/36; B60R 19/285;
(Continued)

(56) References Cited

U.S. PATENT DOCUMENTS 6,135,517 A * 10/2000 Cordebar ................ B60R 19/24
293/154
8,505,995 B2 * 8/2013 Meyers .................... B60R 19/24
296/29
(Continued)

FOREIGN PATENT DOCUMENTS

CN 1727223 A * 2/2006 ............. B60R 19/18
EP 1878621 A1 * 1/2008 ............. B60R 19/18
(Continued)

OTHER PUBLICATIONS

Inoue (WO 2011013195 A1) machine translation (Year: 2011).*

*Primary Examiner* — Amy R Weisberg
*Assistant Examiner* — Wenwei Zhuo

(57) ABSTRACT

A bumper attachment retainer including: a support portion configured to support, from a back face of a bumper, an upper face section of the bumper at which an upper face of the bumper is formed; a first upper restricting portion configured to make contact with the upper face section of the bumper, which is disposed at a reference position with the upper face section supported by the support portion, to restrict a position of the bumper in an attachment direction, and to release positional restriction of the bumper in a case in which a motive force in the attachment direction acting on the bumper disposed at the reference position is a predetermined force or greater; and a second upper restricting portion configured to make contact with the upper face section of the bumper disposed at the reference position and to restrict a position of the bumper in a detachment direction.

3 Claims, 19 Drawing Sheets

(58) Field of Classification Search
CPC ....... B60R 2019/1886; B60R 2019/247; F16B 5/06; F16B 5/121; F16B 5/128; F16B 21/086
USPC .................. 293/155, 154, 14, 102, 132, 131
See application file for complete search history.

(56) References Cited

U.S. PATENT DOCUMENTS

| | | | | |
|---|---|---|---|---|
| 9,004,804 | B2* | 4/2015 | Yamamoto | F16B 5/126 403/326 |
| 2007/0096482 | A1* | 5/2007 | Matsui | B60R 19/24 293/154 |
| 2010/0052365 | A1* | 3/2010 | Stablo | B62D 65/02 29/559 |
| 2012/0043771 | A1* | 2/2012 | Sachs | B60R 19/24 293/102 |
| 2012/0125699 | A1* | 5/2012 | Guthrie | B60N 2/54 267/164 |
| 2014/0084609 | A1* | 3/2014 | Momii | B60R 19/24 293/155 |
| 2015/0028607 | A1* | 1/2015 | Kojima | F16B 5/07 293/155 |
| 2022/0219632 | A1* | 7/2022 | Masuda | F16B 5/121 |

FOREIGN PATENT DOCUMENTS

| | | | | |
|---|---|---|---|---|
| GB | 2466147 A | * | 6/2010 | ............... A24D 1/00 |
| JP | 2003220909 A | * | 8/2003 | ............. B60R 19/04 |
| JP | 2007-125977 | | 5/2007 | |
| KR | 19980012593 U | * | 6/1998 | |
| WO | WO-2011013195 A1 | * | 2/2011 | ............. B60R 19/24 |

* cited by examiner

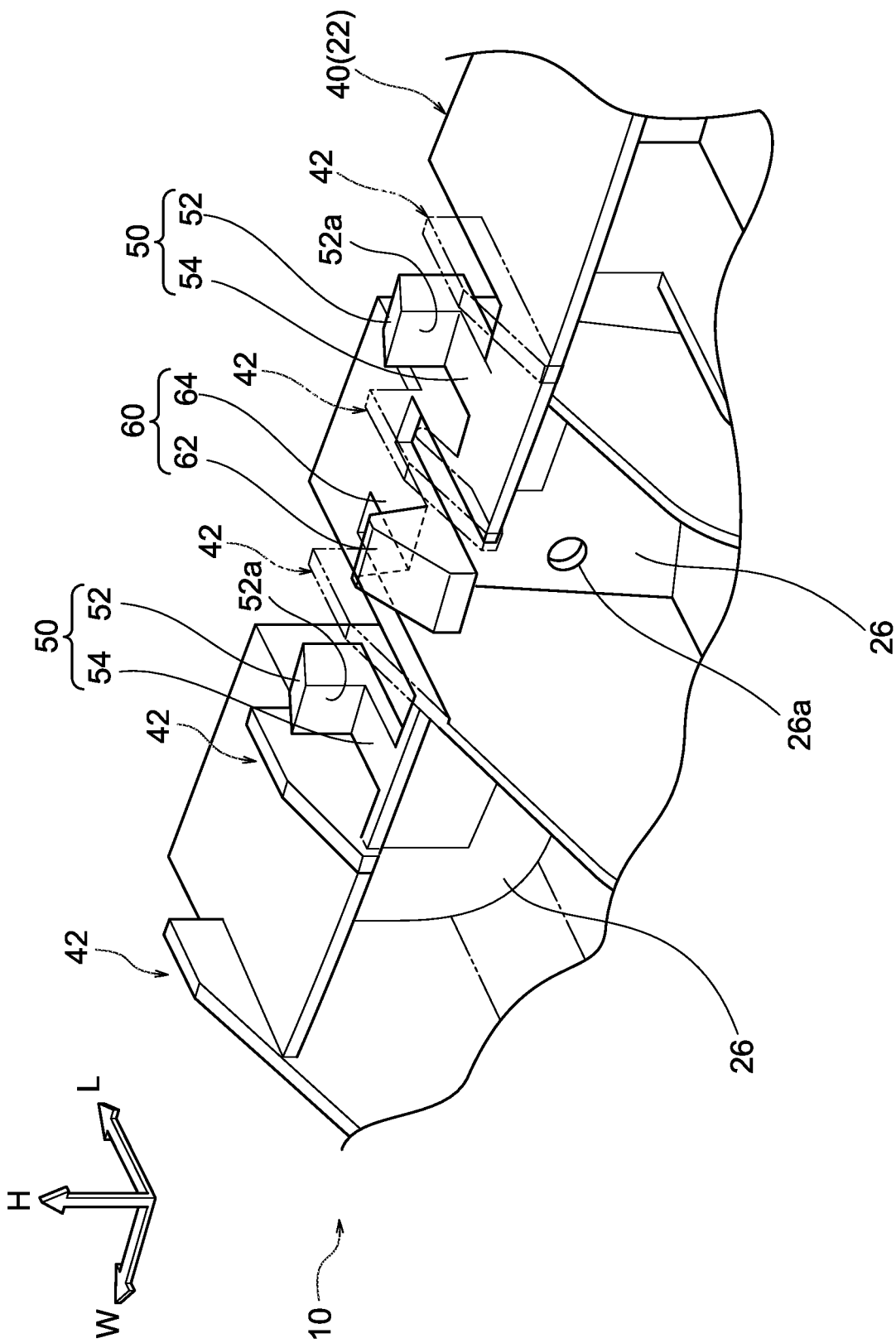

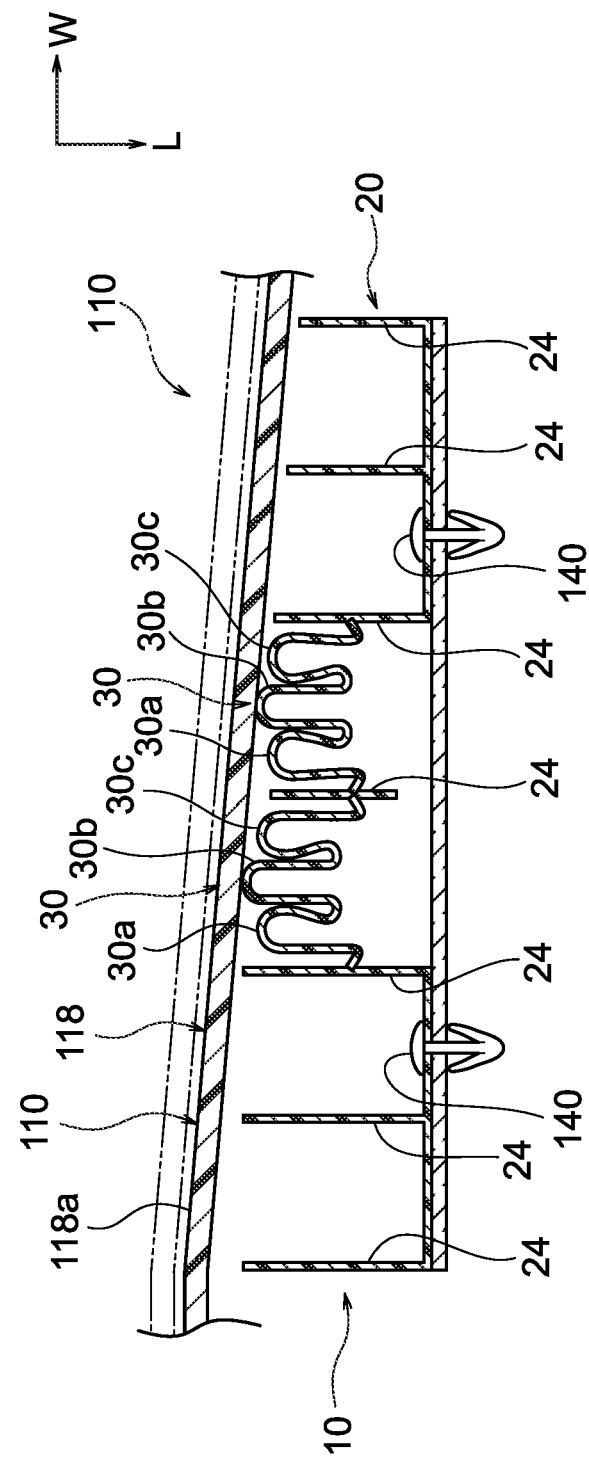

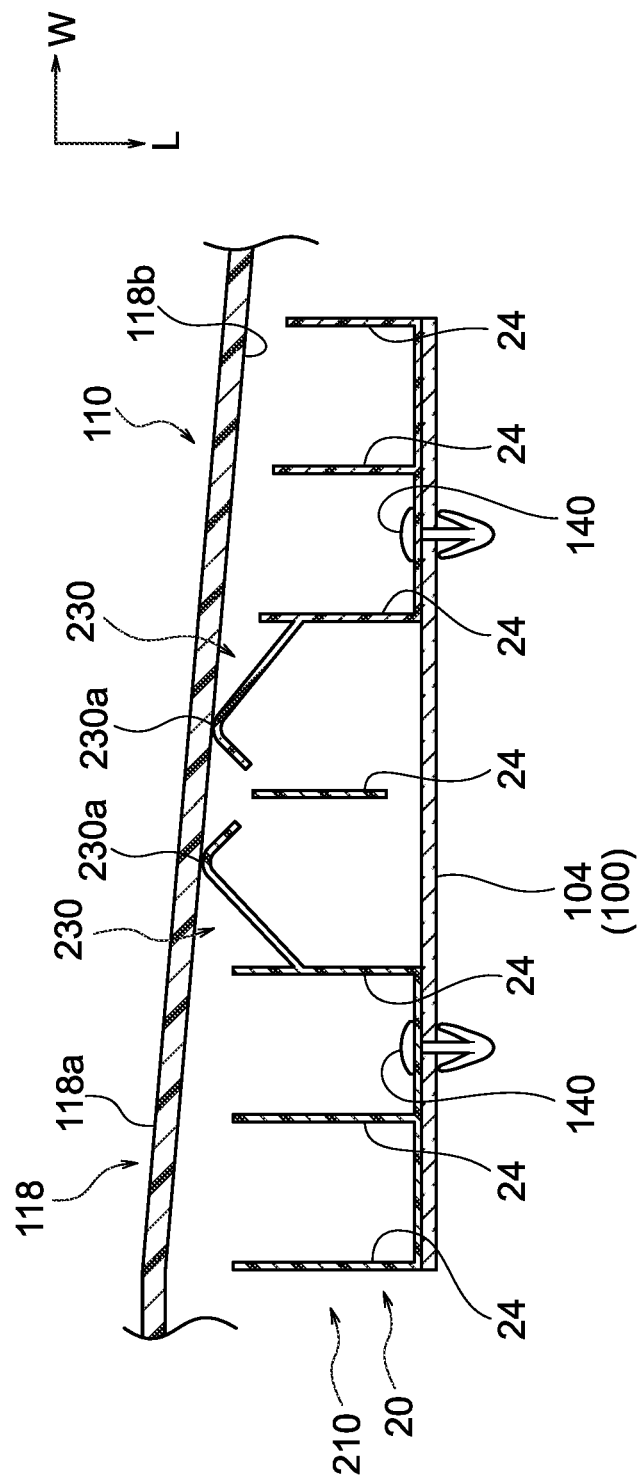

BUMPER ATTACHMENT RETAINER

RELATED APPLICATIONS

This application is a National Phase of PCT Patent Application No. PCT/JP2020/018583 having International filing date of May 7, 2020, which claims the benefit of priority of Japan Patent Application No. 2019-101503 filed on May 30, 2019. The contents of the above applications are all incorporated by reference as if fully set forth herein in their entirety.

FIELD AND BACKGROUND OF THE INEVNTION

The present disclosure relates to a bumper attachment retainer for attaching a bumper to a vehicle body.

BACKGROUND ART

In a bumper fixing (bumper attachment retainer) disclosed in Japanese Patent Application Laid-Open (JP-A) No. 2007-125977, a bumper fixing is attached to a vehicle body, and a fastener is employed to attach a bumper to the vehicle-body-attached bumper fixing.

SUMMARY OF THE INVENTION

With bumper attachment retainers hitherto, a fastener is employed to attach a bumper to the vehicle-body-attached bumper retainer. Such a fastener is employed to restrict the position of the bumper in both an attachment direction and a detachment direction of the bumper.

With such a bumper attachment retainer, a portion of the retainer that restricts the position in the bumper attachment direction might break if the bumper receives an external shock and the bumper moves in a bumper attachment direction.

The present disclosure addresses the issue of, without employing a fastener, restricting the position of a bumper in a bumper attachment direction and detachment direction and suppressing the portion restricting position in the bumper attachment direction from breaking when the bumper has moved in the attachment direction.

A bumper attachment retainer of a first aspect of the present disclosure includes: a support portion configured to support, from a back face of a bumper, an upper face section of the bumper at which an upper face of the bumper is formed, the bumper having a U-shaped cross-section; a first upper restricting portion configured to make contact with the upper face section of the bumper, which is disposed at a reference position with the upper face section supported by the support portion, to restrict a position of the bumper in an attachment direction, and to release positional restriction of the bumper in a case in which a motive force in the attachment direction acting on the bumper disposed at the reference position is a predetermined force or greater; and a second upper restricting portion configured to make contact with the upper face section of the bumper disposed at the reference position and to restrict a position of the bumper in a detachment direction.

The bumper attachment retainer of the present disclosure enables the position of a bumper to be restricted in both the attachment direction and the detachment direction of the bumper without using a fastener.

BRIEF DESCRIPTION OF THE SEVERAL VIEWS OF THE DRAWINGS

FIG. 2 is an enlarged perspective view illustrating a bumper attachment retainer according to the first exemplary embodiment of the present disclosure.

FIG. 6B is a state diagram illustrating a state of a lower restricting portion provided to a bumper attachment retainer according to the first exemplary embodiment of the present disclosure.

FIG. 13A is a state diagram illustrating a state of a lower restricting portion provided to a bumper attachment retainer according to the second exemplary embodiment of the present disclosure.

DESCRIPTION OF SPECIFIC EMBODIMENTS OF THE INVENTIONS

First Exemplary Embodiment

Figure 1:
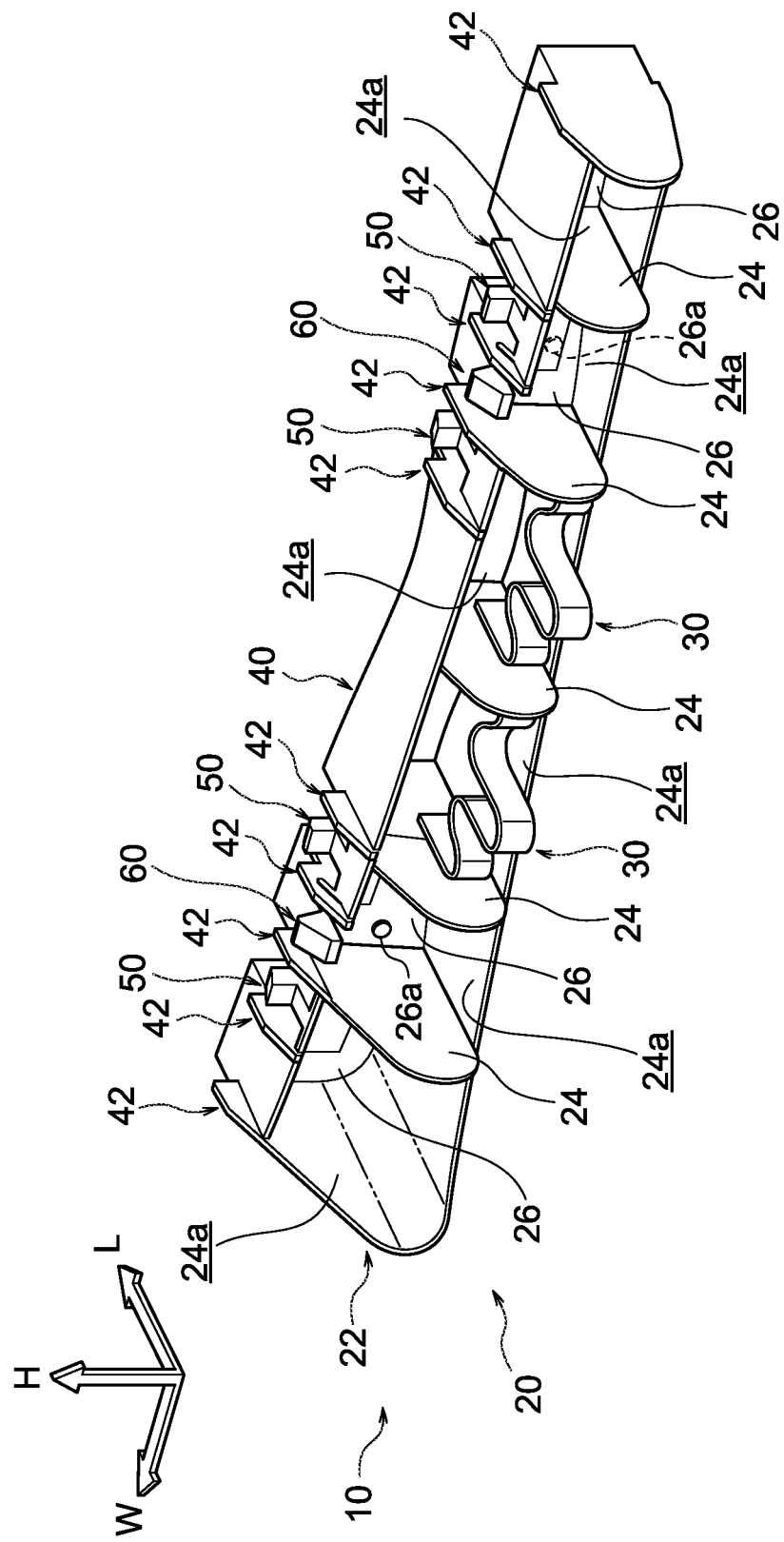
FIG. 1 is an overall perspective view illustrating a bumper attachment retainer according to a first exemplary embodiment of the present disclosure.

An example of a bumper attachment retainer according to a first exemplary embodiment of the present disclosure will now be described with reference to FIG. 1 to FIG. 11. Note that arrow H in the drawings illustrates a vertical direction of a bumper, arrow W illustrates a width direction of a bumper, and arrow L illustrates a front-rear direction of a bumper.

Overall Configuration

Figure 11:
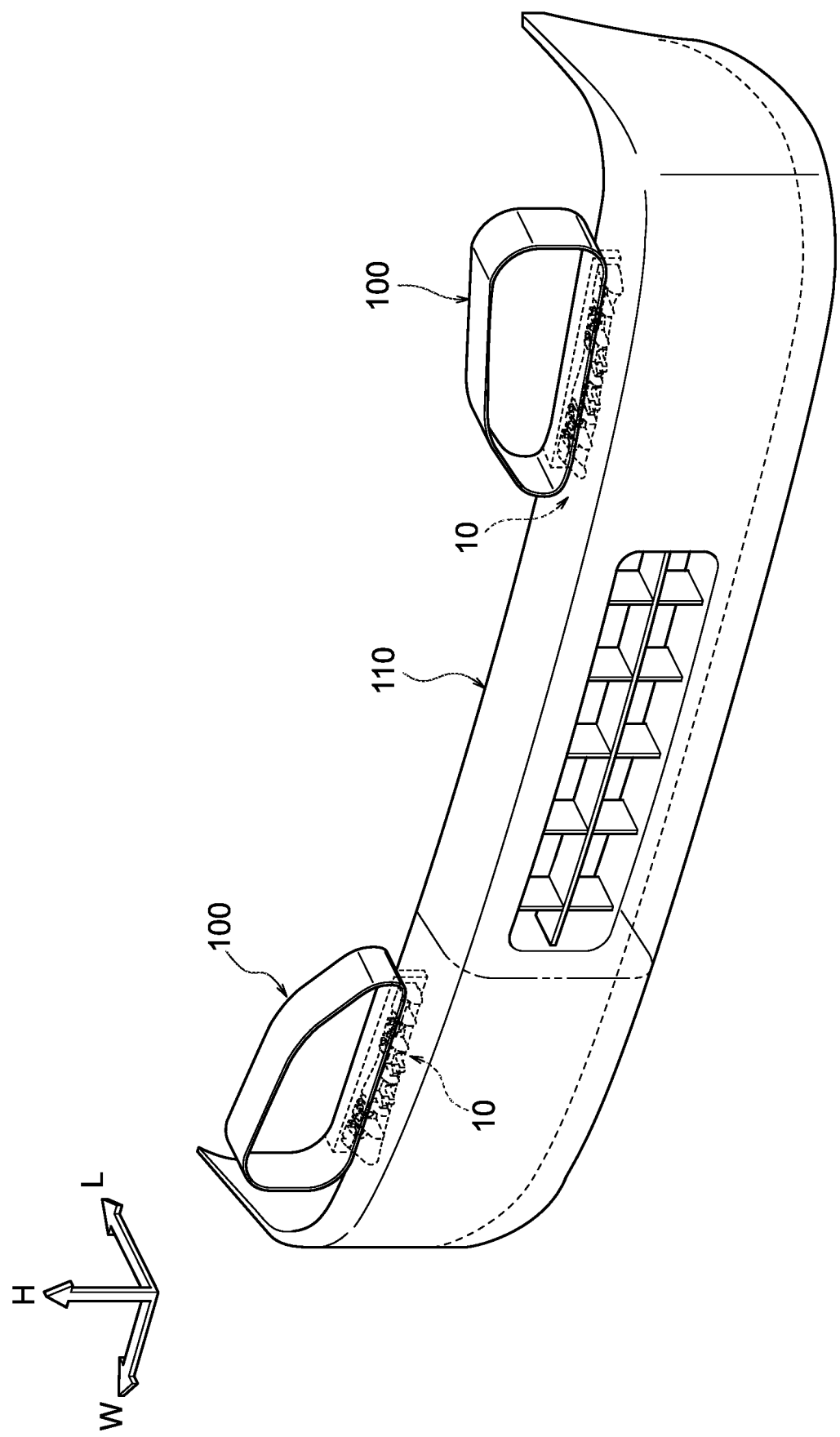
FIG. 11 is an overall perspective view illustrating a bumper attachment retainer according to a first exemplary embodiment of the present disclosure, a bumper, and a headlamp.

As illustrated in FIG. 11, bumper attachment retainers 10 (hereafter referred to as "bumper retainers 10") are respectively arranged below a pair of headlamps 100.

Headlamps 100

Figure 8:
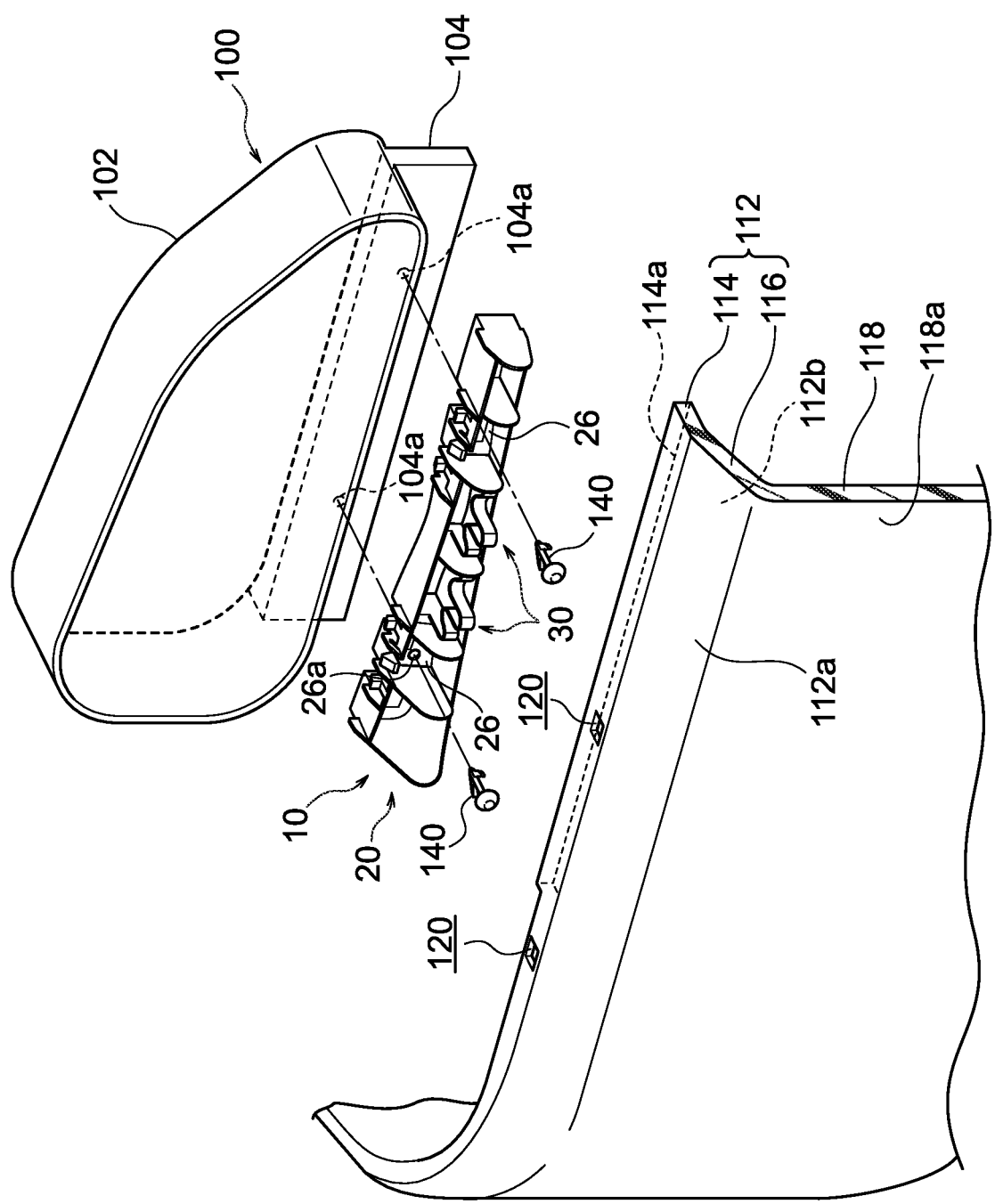
FIG. 8 is an exploded perspective view illustrating a bumper attachment retainer according to a first exemplary embodiment of the present disclosure, a bumper, and a headlamp.

As illustrated in FIG. 8, the headlamps 100 are attached to a non-illustrated vehicle body and each includes a lamp section 102 and an attachment section 104 disposed below the lamp section 102, to which the bumper retainers 10 are attached. The attachment section 104 is plate shaped with a plate thickness direction along the front-rear direction of a bumper (hereafter "bumper front-rear direction"), and is rectangular shaped as viewed along a bumper front-rear direction, extending along a width direction of the bumper (hereafter "bumper width direction"). Moreover, a pair of through holes 104a are formed penetrating through the attachment section 104 in a bumper front-rear direction and separated from each other in the bumper width direction. Moreover, the through holes 104a are circular shaped as viewed in the bumper front-rear direction.

Bumper 110

A bumper 110 is integrally molded using a resin material (for example, a polypropylene resin) at a thickness of, for example from 2 mm to 4 mm. The bumper 110 has a U-shaped cross-section opening rearward in the bumper front-rear direction, as illustrated in FIG. 11. Furthermore, as illustrated in FIG. 8, the bumper 110 includes an upper face section 112 formed with an upward facing upper face 112a, and a vertical face section 118 formed with a vertical face 118a facing forward in the bumper front-rear direction. An upper edge of the vertical face section 118 is connected to a front edge of the upper face section 112.

A flange section 114 is formed to the upper face section 112 so as to be disposed below the lamp sections 102 of the headlamps 100 in a state in which the bumper 110 is attached to the bumper retainers 10. The plate thickness direction of the flange section 114 is along the bumper vertical direction. Moreover, a connection section 116 is formed to the upper face section 112 so as to be disposed between the flange section 114 and the vertical face section 118. The plate thickness direction of the connection section 116 is inclined forwards with respect to the bumper vertical direction.

An end face 114a of the flange section 114 faces rearward in the bumper front-rear direction and extends along the bumper width direction.

Furthermore, a pair of through holes 120 are formed so as penetrate through the flange section 114 in the vertical direction of the bumper (hereafter "bumper vertical direction") and be separated in the bumper width direction. The through holes 120 are rectangular shaped when viewed along the bumper vertical direction and extend in the bumper width direction.

Bumper Retainers 10

The bumper retainers 10 are each integrally molded using a resin material (for example, a polyacetal resin) at a thickness of, for example from 1 mm to 3 mm. As illustrated in FIG. 11, the bumper retainers 10 are provided in pairs separated from each other in the bumper width direction, and a pair of the bumper retainers 10 are formed that are symmetrical to each other in the bumper width direction. As stated above, the pair of bumper retainers 10 are arranged below the headlamps 100. Description follows regarding one of the bumper retainers 10.

As illustrated in FIG. 1 and FIG. 8, the bumper retainers 10 extend in the bumper width direction and each include a body section 20 configuring a framework section of the bumper retainers 10, and lower restricting portions 30 restricting a rearward position of the bumper 110 in the bumper front-rear direction. Details regarding the lower restricting portions 30 will be described later.

As illustrated in FIG. 1, the body section 20 includes a frame 22 having a frame shape extending in the bumper width direction as viewed from the bumper front-rear direction, and plural partition portions 24 partitioning the interior of the frame 22 in the bumper width direction. Furthermore, the body section 20 includes wall portions 26 configuring walls at the bumper front-rear direction rear of spaces 24a partitioned by the partition portions 24.

Frame 22

As illustrated in FIG. 1, the frame 22 includes an opposing section 40 opposing the upper face section 112 of the bumper 110 (see FIG. 8) in the bumper vertical direction. The opposing section 40 is plate shaped with a plate thickness direction along the bumper vertical direction and extends along the bumper width direction. Moreover, support portions 42 are connected to the opposing section 40 for supporting the upper face section 112 of the bumper 110 from a back face 112b of the upper face section 112 (see FIG. 7). First upper restricting portions 50 (see FIG. 5A) are also connected to the opposing section 40 for restricting a bumper front-rear direction rearward position of the bumper 110 disposed at a reference position such that the back face 112b of the upper face section 112 is supported by the support portions 42. Second upper restricting portions 60 (see FIG. 4A) are also connected to the opposing section 40 for restricting a bumper front-rear direction forward position of the bumper 110 disposed at the reference position.

Reference here to "bumper front-rear direction rearward" is a direction to attach the bumper 110 to the vehicle body. Thus hereafter "bumper front-rear direction rearward" is sometimes referred to as the "attachment direction". Moreover, "bumper front-rear direction forward" is a direction to detach the bumper 110 from the vehicle body. Thus hereafter "bumper front-rear direction forward" is sometimes referred to as the "detachment direction".

Furthermore, the "reference position of the bumper 110" is a position of the bumper 110 when design values are achieved for the relative position between the bumper 110 and the bumper retainers 10. In other words, the "reference position of the bumper 110" is a position of the bumper 110 when design values are also achieved for the relative position between the bumper 110 and the vehicle body.

Note that detailed description is given later regarding the support portions 42, the first upper restricting portions 50, and the second upper restricting portions 60.

Partition Portions 24

As illustrated in FIG. 1, the partition portions 24 partition the interior of the frame 22 in the bumper width direction.

Specifically, the partition portions 24 are plate shaped with a plate thickness direction along the bumper width direction, and there are five of the partition portions 24 provided so as to be separated from each other in the bumper width direction. A bumper front-rear direction forward portion of each of the partition portions 24 has a circular arc convex shape, as viewed along the bumper width direction. The interior of the frame 22 is partitioned into six of the spaces 24a by the five partition portions 24.

Wall Portions 26

As illustrated in FIG. 1, the wall portions 26 configure walls at the bumper front-rear direction rear of the spaces 24a partitioned by the partition portions 24.

Specifically, the wall portions 26 configure walls at the bumper front-rear direction rear of two of the spaces 24a formed at the inside in the bumper width direction and walls at the bumper front-rear direction rear of two of the spaces 24a formed at the outside in the bumper width direction.

There are four of these wall portions 26 provided in a plate shaped with a plate thickness direction along the bumper front-rear direction. Furthermore, through holes 26a are formed in the wall portion 26 that is the second from the inside in the bumper width direction and in the wall portion 26 that is the second from the outside in the bumper width direction, with the through holes 26a aligned with the pair of through holes 104a (see FIG. 8) formed in the attachment section 104 of the headlamps 100 when viewed along the bumper front-rear direction.

Note that "inside in the bumper width direction" refers to a central portion side of the bumper 110 in the bumper width direction, and "outside in the bumper width direction" refers to a side away from the central portion of the bumper 110 in the bumper width direction.

Figure 9:
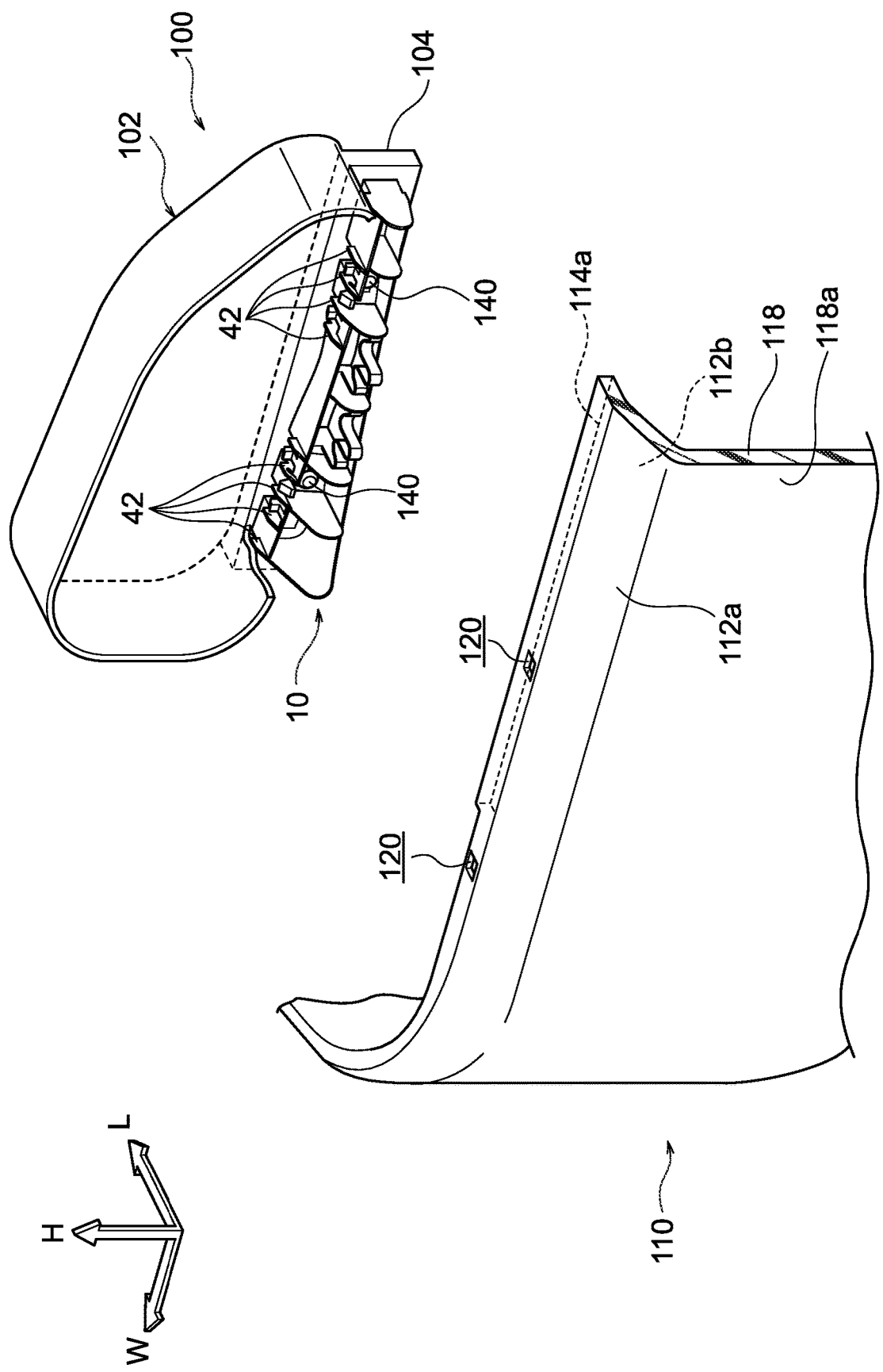
FIG. 9 is a partial exploded perspective view illustrating a bumper attachment retainer according to a first exemplary embodiment of the present disclosure, a bumper, and a headlamp.

In this configuration, as illustrated in FIG. 8 and FIG. 9, an operative inserts leading end portions of anchor type clips 140 through the through holes 26a of the wall portions 26 of the bumper retainers 10 and through the through holes 104a (see FIG. 8) of the attachment section 104 of the headlamps 100. The bumper retainers 10 are thereby attached to the headlamps 100.

Relevant Configuration

Description now follows regarding the lower restricting portions 30, the support portions 42, the first upper restricting portions 50, and the second upper restricting portions 60.

Lower Restricting Portions 30

There are two of the lower restricting portions 30 illustrated in FIG. 1 provided in a row along the bumper width direction. One of the lower restricting portions 30 is arranged in the space 24a that is the third from the bumper width direction outside and another of the lower restricting portions 30 is arranged in the space 24a that is the fourth from the bumper width direction outside.

Figure 6A:
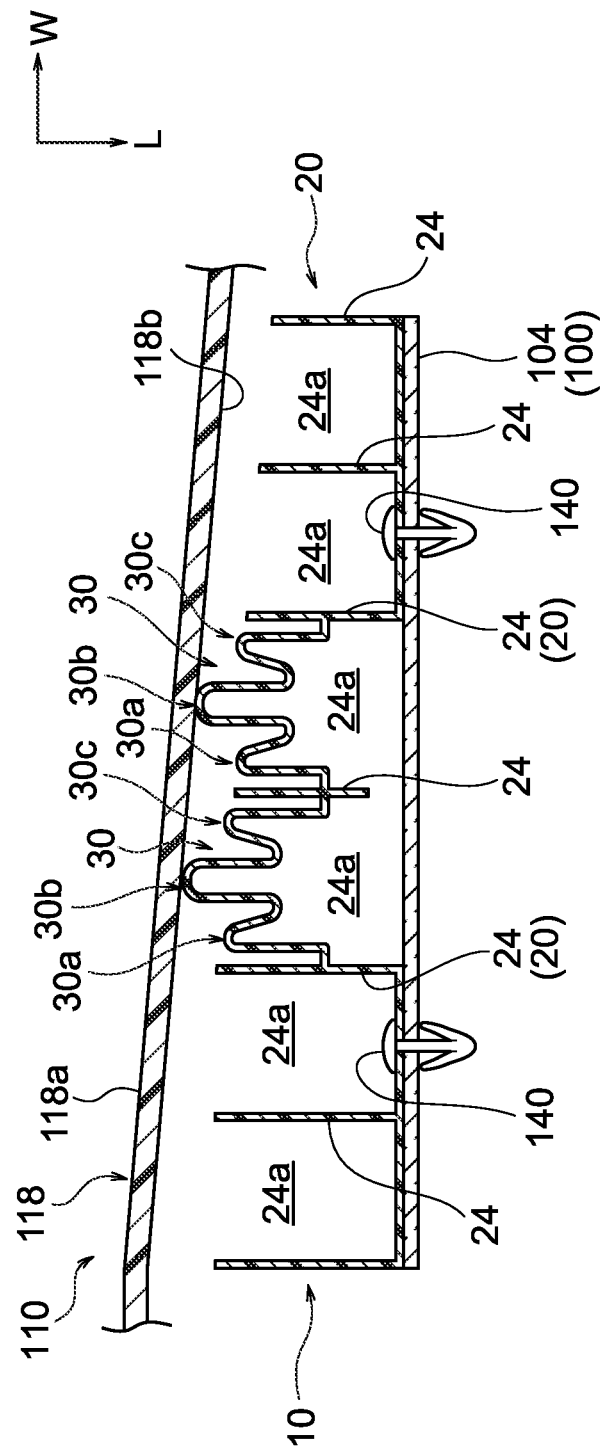
FIG. 6A is a state diagram illustrating a state of a lower restricting portion provided to a bumper attachment retainer according to the first exemplary embodiment of the present disclosure.

As illustrated in FIG. 1 and FIG. 6A, the lower restricting portions 30 have a wavy shape undulating in the detachment direction as viewed along the bumper vertical direction, and both ends of the lower restricting portions 30 are connected to the partition portions 24 of the body section 20. Furthermore, each of the lower restricting portions 30 includes three projections 30a, 30b, 30c projecting out in the detachment direction. The three projections 30a, 30b, 30c are arranged side-by-side in this sequence along the bumper width direction.

The projections 30b project out more in the detachment direction than the projections 30a, 30c, and the leading ends of the projections 30b make contact with a back face 118b of the vertical face section 118 of the bumper 110 disposed at the reference position. In other words, the leading ends of the projections 30b of the lower restricting portions 30 in a state not loaded with external force (unloaded state) make contact with a back face 118b of the vertical face section 118 of the bumper 110 disposed at the reference position. One end of the projections 30a and one end of the projections 30c are connected to respective plate faces of the partition portions 24. The lower restricting portions 30 are thereby supported by the partition portions 24 of the body section 20 in a double supported state.

Support Portions 42

As illustrated in FIG. 1, there are plural of the support portions 42 provided so as to be connected to the opposing section 40 of the frame 22. There are five of the support portions 42 arranged at a bumper width direction outside portion of the opposing section 40 and there are five of the support portions 42 arranged at a bumper width direction inside portion of the opposing section 40. These support portions 42 are separated from each other in the bumper width direction.

Figure 7:
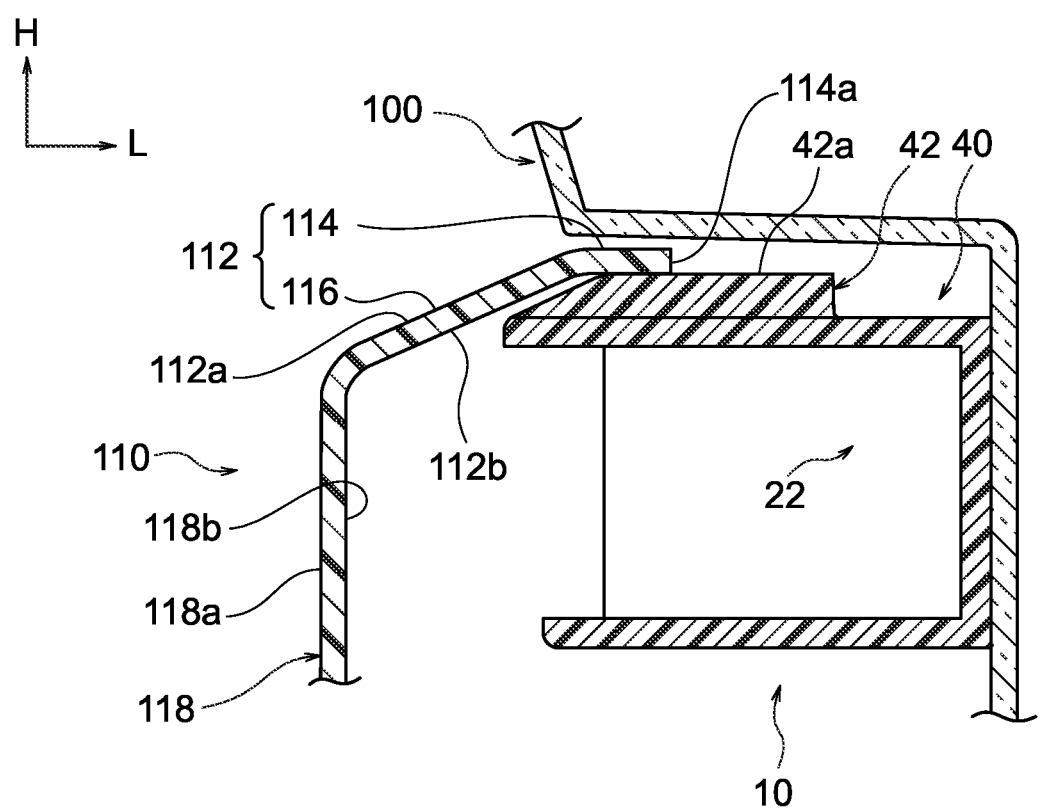
FIG. 7 is a cross-section illustrating a support portion provided to a bumper attachment retainer according to the first exemplary embodiment of the present disclosure.

The support portions 42 are plate shaped with a plate thickness direction along the bumper width direction, and each have a trapezoidal shape viewed along the bumper width direction, as illustrated in FIG. 7. An upper end face 42a of each of the support portions 42 contacts the back face 112b of the flange section 114 of the upper face section 112.

Due to the upper end faces 42a of the plural support portions 42 making contact with the back face 112b of the flange section 114 of the upper face section 112 in this manner, the plural support portions 42 respectively support the upper face section 112 of the bumper 110 from the back face 112b.

First Upper Restricting Portions 50

As illustrated in FIG. 1, there are plural of the first upper restricting portions 50 provided so as to be connected to the opposing section 40 of the frame 22. There are two of the first upper restricting portions 50 arranged at a bumper width direction outside portion of the opposing section 40 and there are two of the first upper restricting portions 50 arranged at a bumper width direction inside portion of the opposing section 40. The first upper restricting portions 50 are separated from each other in the bumper width direction. Moreover, the support portions 42 are arranged in the bumper width direction so as to be disposed a both sides of the first upper restricting portions 50. In other words, each of the first upper restricting portions 50 is disposed at the bumper width direction between a pair of the support portions 42.

Figure 5A:
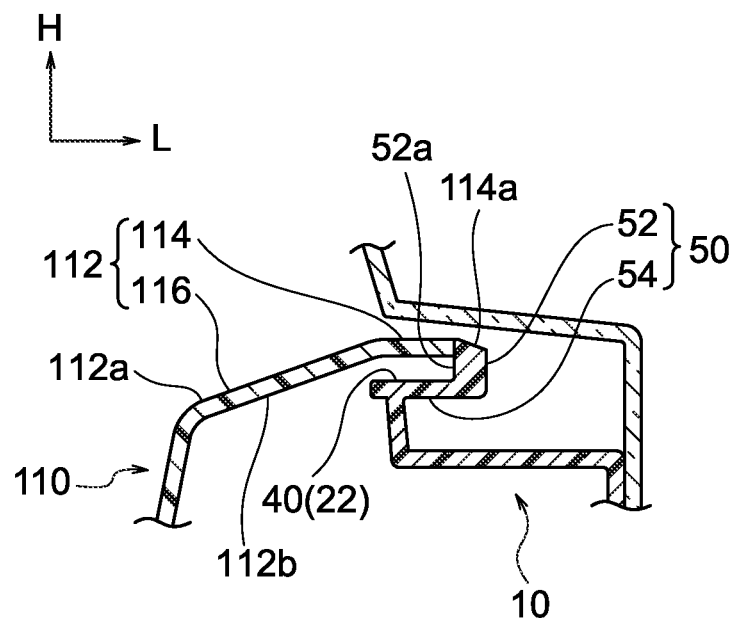
FIG. 5A is a state diagram illustrating a state of a first upper restricting portion provided to a bumper attachment retainer according to the first exemplary embodiment of the present disclosure.

As illustrated in FIG. 2 and FIG. 5A, the first upper restricting portions 50 each include a contact portion 52 to make contact with the end face 114a of the flange section 114 of the upper face section 112, and a cantilever portion 54 of cantilevered shape that has one end connected to the contact portion 52 and another end connected to the opposing section 40.

The contact portion 52 extends in the bumper vertical direction and has a rectangular shaped cross-section, with a contact face 52a formed on the contact portion 52 to make contact with the end face 114a of the flange section 114. The cantilever portion 54 extends in the attachment direction, with a bottom end of the contact portion 52 connected to a rear end of the cantilever portion 54 and the opposing section 40 of the frame 22 connected to the front end of the cantilever portion 54.

Second Upper Restricting Portions 60

As illustrated in FIG. 1, there are plural of the second upper restricting portions 60 connected to the opposing section 40 of the frame 22. One of the second upper restricting portions 60 is arranged at a bumper width direction outside portion of the opposing section 40, and one of the second upper restricting portions 60 is arranged at a bumper width direction inside portion of the opposing section 40. The second upper restricting portions 60 are each disposed at the bumper width direction between a pair of the first upper restricting portions 50. A support portion 42, a first upper restricting portion 50, a support portion 42, a second upper restricting portion 60, a support portion 42, a first upper restricting portion 50, and a support portion 42 are arranged side-by-side in this sequence along the bumper width direction.

Figure 4A:
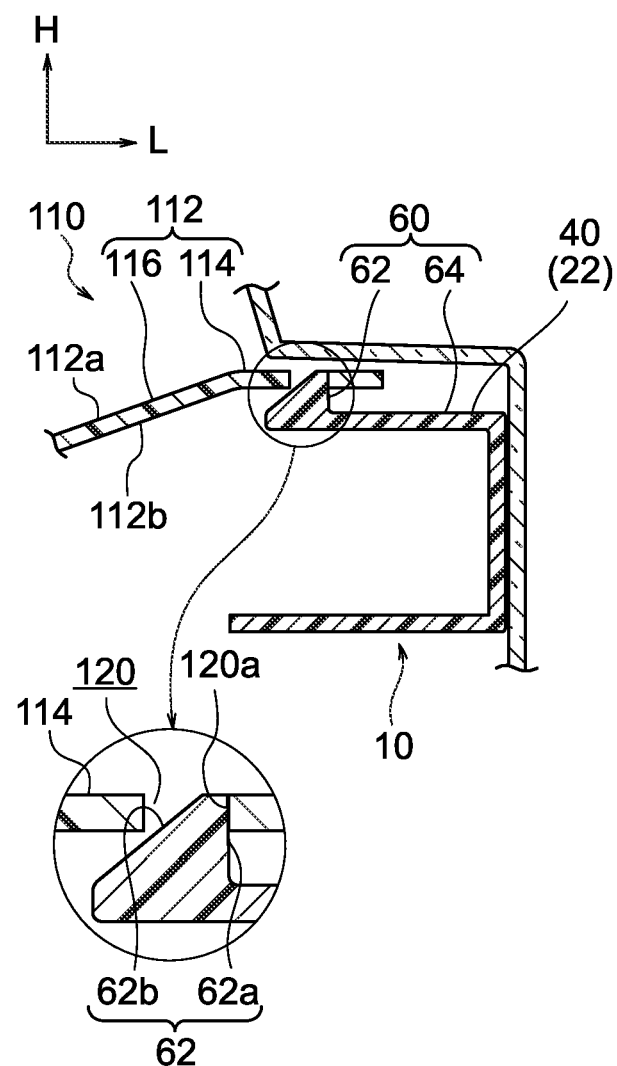
FIG. 4A is a state diagram illustrating a state of a second upper restricting portion provided to a bumper attachment retainer according to the first exemplary embodiment of the present disclosure.

As illustrated in FIG. 2 and FIG. 4A, each of the second upper restricting portions 60 includes an engaging claw 62 for insertion into the through hole 120 formed in the flange section 114 of the upper face section 112 so as to make contact with an edge face 120a of the through hole 120 and to engage with the through hole 120. Moreover, each of the second upper restricting portions 60 includes a cantilever portion 64 of a cantilevered shape having one end connected to the engaging claw 62 and another end connected to the opposing section 40. The cantilever portion 64 is an example of a second cantilever portion.

The engaging claw 62 extends in the bumper vertical direction. The engaging claw 62 is formed with a contact face 62a facing in the attachment direction to make contact with the edge face 120a of the through hole 120, and with an inclined face 62b facing diagonally upward with respect to the detachment direction. The cantilever portion 64 extends along the detachment direction, and a lower end of the engaging claw 62 is connected to a front end of the cantilever portion 64, and the opposing section 40 of the frame 22 is connected to the rear end of the cantilever portion 64.

Operation

Next, description follows regarding operation and the like of the bumper retainers 10.

Figure 10:
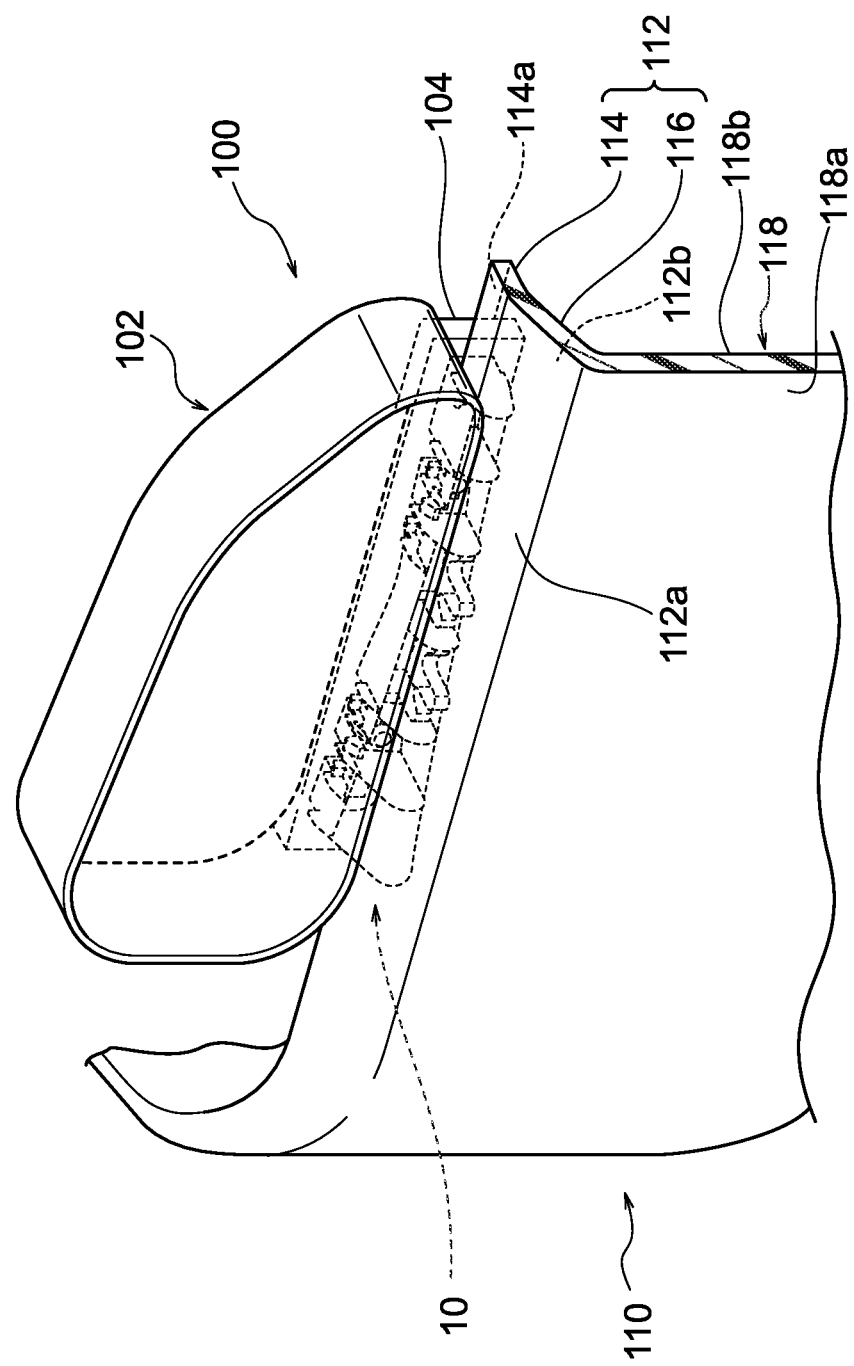
FIG. 10 is a perspective view illustrating a bumper attachment retainer according to a first exemplary embodiment of the present disclosure, a bumper, and a headlamp.

As illustrated in FIG. 9 and FIG. 10, an operative moves the bumper 110, which is detached from a vehicle body, in the attachment direction such that the upper face section 112 of the bumper 110 is supported from the back face 112b by the support portions 42 of the bumper retainers 10 attached to the attachment section 104 of the headlamps 100.

Figure 3A:
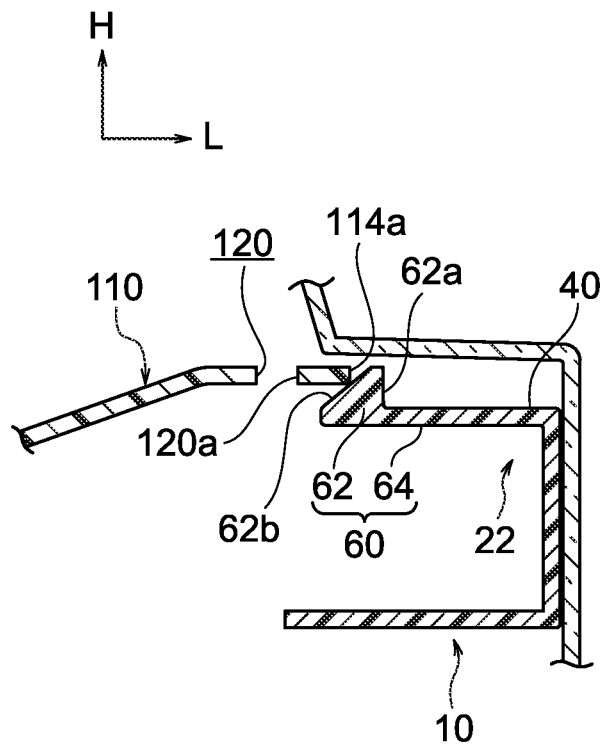
FIG. 3A is a state diagram illustrating a state of a second upper restricting portion provided to a bumper attachment retainer according to the first exemplary embodiment of the present disclosure.
Figure 3B:
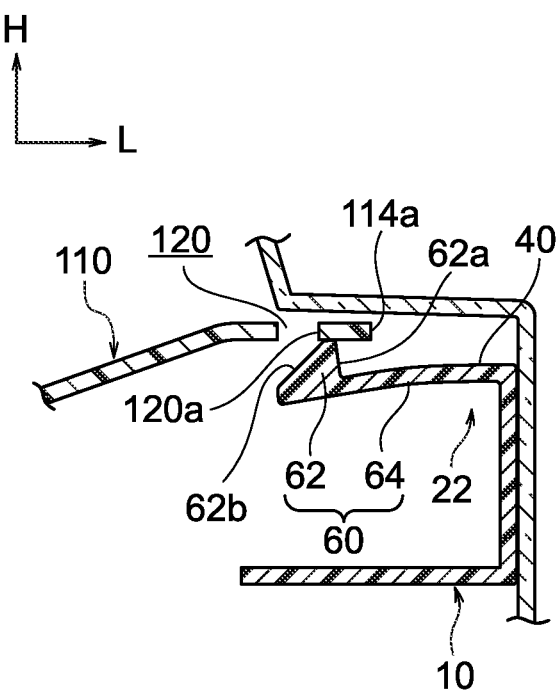
FIG. 3B is a state diagram illustrating a state of a second upper restricting portion provided to a bumper attachment retainer according to the first exemplary embodiment of the present disclosure.
Figure 3C:
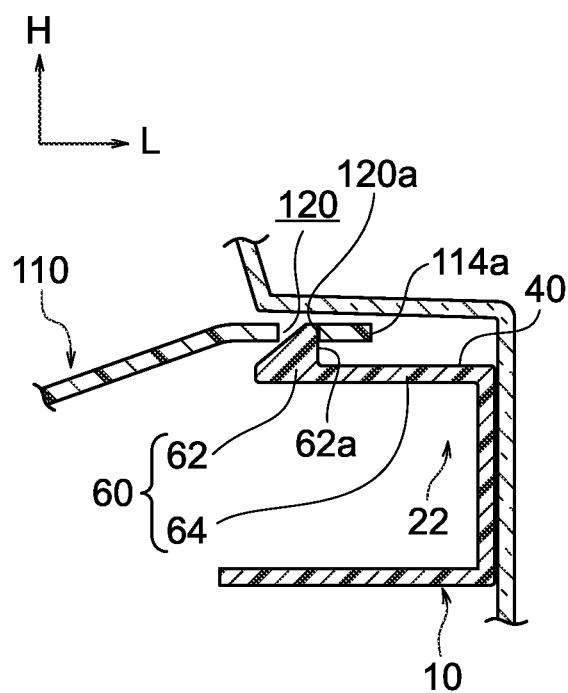
FIG. 3C is a state diagram illustrating a state of a second upper restricting portion provided to a bumper attachment retainer according to the first exemplary embodiment of the present disclosure.

As illustrated in FIG. 3A, when this is performed the end face 114a of the bumper 110 makes contact in the attachment direction with the inclined faces 62b of the engaging claws 62 of the second upper restricting portions 60. Then, as illustrated in FIG. 3B, when the bumper 110 is moved further in the attachment direction, the cantilever portion 64 of the second upper restricting portions 60 undergoes resilient deformation, and the engaging claw 62 moves downward. Moreover, as illustrated in FIG. 3C, when the bumper 110 is moved further in the attachment direction, the cantilever portions 64 of each of the second upper restricting portions 60 rebound resiliently, the engaging claw 62 is inserted into the through hole 120, and the contact face 62a of the engaging claw 62 makes contact in the attachment direction with the edge face 120a of the through hole 120. The engaging claw 62 thereby engages with the through hole 120. The second upper restricting portions 60 thereby restrict the position of the bumper 110 in the detachment direction.

As illustrated in FIG. 7, in this state the upper end face 42a of the support portions 42 makes contact with the back face 112b of the flange section 114 of the upper face section 112. Due to the upper end face 42a of the support portions 42 making contact with the back face 112b of the flange section 114 of the upper face section 112 in this manner, the support portions 42 support the upper face section 112 of the bumper 110, and the bumper 110 is disposed at the reference position.

As illustrated in FIG. 6A, in a state in which the bumper 110 is disposed at the reference position, the leading ends of the projections 30b of the lower restricting portions 30 make contact in the detachment direction with the back face 118b of the vertical face section 118 of the bumper 110. The lower restricting portions 30 thereby restrict the position of the bumper 110 in the attachment direction.

Moreover, as illustrated in FIG. 5A, in a state in which the bumper 110 is disposed at the reference position, the contact faces 52a of the contact portions 52 of the first upper restricting portions 50 make contact in the detachment direction with the end face 114a of the flange section 114 of the upper face section 112. The first upper restricting portions 50 thereby restrict the position of the bumper 110 in the attachment direction.

Next, description follows regarding a case in which the operative moves the bumper 110, which is detached from the vehicle body, too far when moving the bumper 110 in the attachment direction. In other words, a case will be described in which the bumper 110 has been moved further in the attachment direction than the reference position.

As illustrated in FIG. 6B, when the bumper 110 moves further in the attachment direction than the reference position, the projections 30b of the lower restricting portions 30 are pressed in the attachment direction by the bumper 110, and the lower restricting portions 30 having a wavy shape undergo resilient deformation by changing amplitude. Specifically, due to the projections 30b being pressed in the attachment direction the projections 30a, 30c are squashed in the attachment direction and tilt toward the projection 30b side. The lower restricting portions 30 accordingly undergo resilient deformation without spreading out wider in the bumper width direction.

Figure 4B:
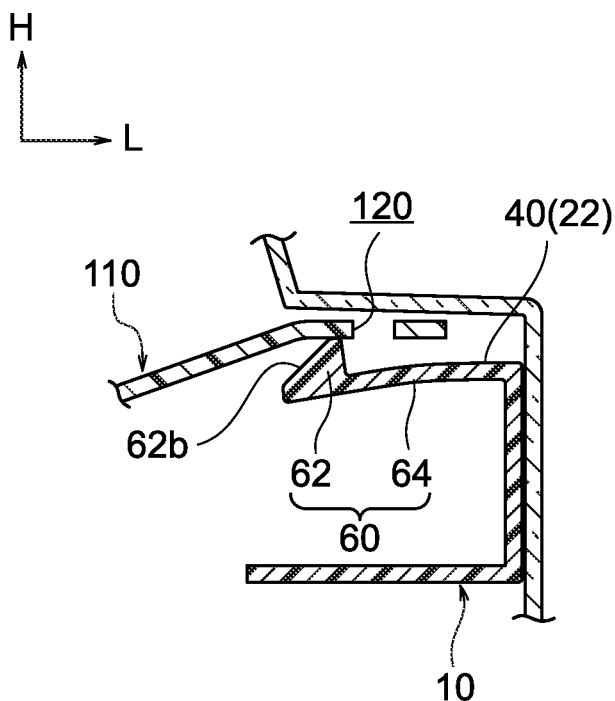
FIG. 4B is a state diagram illustrating a state of a second upper restricting portion provided to a bumper attachment retainer according to the first exemplary embodiment of the present disclosure.
Figure 5B:
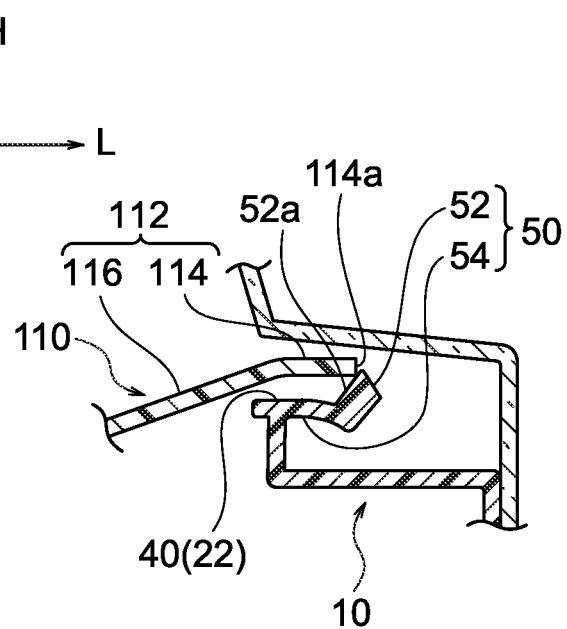
FIG. 5B is a state diagram illustrating a state of a first upper restricting portion provided to a bumper attachment retainer according to the first exemplary embodiment of the present disclosure.

Moreover, as illustrated in FIG. 5B, when the bumper 110 is moved further in the attachment direction with respect to the reference position, the cantilever portions 54 of the first upper restricting portions 50 undergo resilient deformation, and the contact portion 52 moves downward while tilting. As illustrated in FIG. 4B, the cantilever portions 64 of the second upper restricting portions 60 also undergo resilient deformation, and the engaging claws 62 move downward while tilting.

The lower restricting portions 30 rebound resiliently when the operative releases the force that was moving the bumper 110 in the attachment direction. The resiliently rebounding lower restricting portions 30 impart the bumper 110 with motive force to move the bumper 110 to the reference position.

As illustrated in FIG. 6A, the cantilever portions 54 of the first upper restricting portions 50 rebound resiliently due to the bumper 110 moving to the reference position, and, as illustrated in FIG. 5A, the contact faces 52a of the contact portions 52 make contact with the end face 114a of the flange section 114 of the upper face section 112. Furthermore, the cantilever portions 64 of the second upper restricting portions 60 rebound resiliently, the engaging claws 62 are inserted into the through hole 120 as illustrated in FIG. 4A, and the contact faces 62a of the engaging claws 62 make contact with the edge faces 120a of the through holes 120.

Next, description follows regarding a case in which the bumper 110 disposed at the reference position receives an external shock.

When the bumper 110 receives an external shock, the bumper 110 tends to move further in the attachment direction than the reference position. As illustrated in FIG. 5B, when the bumper 110 moves further in the attachment direction (toward the vehicle body side) than the reference position, the cantilever portions 54 of the first upper restricting portions 50 undergo resilient deformation, and the contact portions 52 move downward while tilting. The first upper restricting portions 50 absorb energy of the external shock received by the bumper 110 by the cantilever portions 54 undergoing resilient deformation. As illustrated in FIG. 4B, the cantilever portions 64 of the second upper restricting portions 60 also undergo resilient deformation, and the engaging claws 62 moves downward while tilting. The second upper restricting portions 60 absorb energy of the external shock received by the bumper 110 by the cantilever portions 64 undergoing resilient deformation.

Figure 5C:
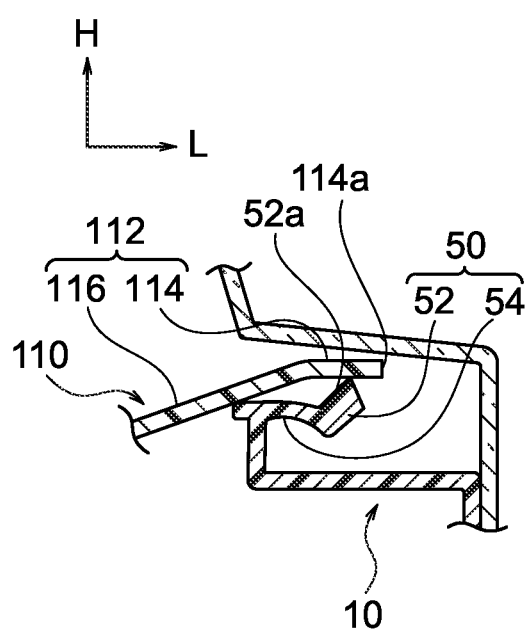
FIG. 5C is a state diagram illustrating a state of a first upper restricting portion provided to a bumper attachment retainer according to the first exemplary embodiment of the present disclosure.

In cases in which the shock force on the bumper 110 is a predetermined force or greater (cases in which motive force acting on the bumper 110 is the predetermined force or greater), as illustrated in FIG. 5C, the bumper 110 is moved further in the attachment direction, and the cantilever portions 54 of the first upper restricting portions 50 undergo further resilient deformation. The contact faces 52a of the contact portions 52 separate from the end face 114a, and the first upper restricting portions 50 release positional restriction of the bumper 110.

Figure 4C:
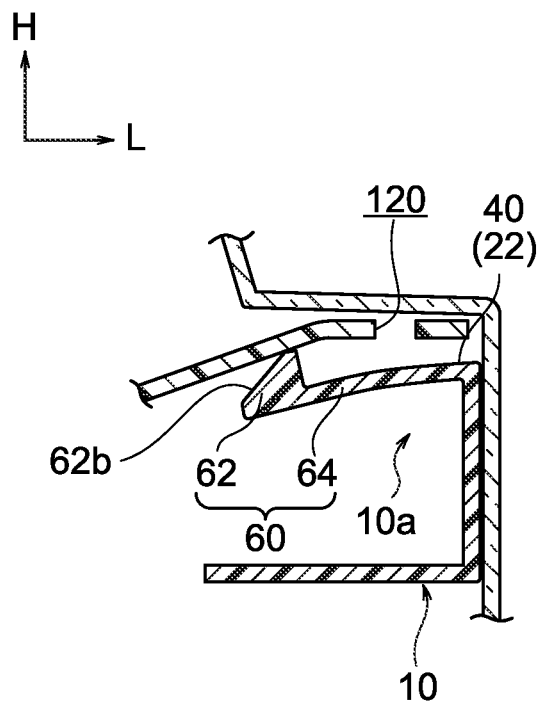
FIG. 4C is a state diagram illustrating a state of a second upper restricting portion provided to a bumper attachment retainer according to the first exemplary embodiment of the present disclosure.

As illustrated in FIG. 4C, in cases in which the shock force on the bumper 110 is the predetermined force or greater (cases in which the motive force acting on the bumper 110 is the predetermined force or greater), the cantilever portions 64 of the second upper restricting portions 60 undergo further resilient deformation, and the engaging claws 62 move downward while tilting. Due to the cantilever portions 64 resiliently deforming, the engaging claws 62 exit the through holes 120, engagement between the engaging claws 62 and the through holes 120 is released, and the second upper restricting portions 60 release positional restriction of the bumper 110.

Advantageous Effects

As described above, in the bumper retainers 10 the contact faces 52a of the contact portions 52 of the first upper restricting portions 50 make contact with the end face 114a of the bumper 110, and the first upper restricting portions 50 of the bumper retainers 10 restrict the attachment direction position of the bumper 110 disposed at the reference position (see FIG. 5A). Moreover, the contact faces 62a of the engaging claws 62 of the second upper restricting portions 60 of the bumper retainers 10 make contact with the edge faces 120a of the through holes 120 of the bumper 110, and due to the engaging claws 62 engaging with the through holes 120 the second upper restricting portions 60 restrict the detachment direction position of the bumper 110 disposed at the reference position (see FIG. 4A).

In this manner the bumper retainers 10 enable the position of the bumper 110 to be restricted in both the attachment direction and the detachment direction of the bumper 110, without using a fastener.

Moreover, in cases in which the bumper 110 receives an external shock, the bumper 110 tends to move further in the attachment direction than the reference position. When the bumper 110 moves further in the attachment direction (toward the vehicle body side) than the reference position the cantilever portions 54 of the first upper restricting portions 50 undergo resilient deformation, and the contact portions 52 move downward while tilting (see FIG. 5B). Moreover, in cases in which a shock force on the bumper 110 is the predetermined force or greater, the bumper 110 moves further in the attachment direction, and the cantilever portions 54 of the first upper restricting portions 50 undergo further resilient deformation. The contact faces 52a of the contact portions 52 separate from the end face 114a, and the first upper restricting portions 50 release positional restriction of the bumper 110 (see FIG. 5C).

Thus due to the above action, without using a fastener the bumper retainers 10 restrict the position of the bumper in both the attachment direction and the detachment direction of the bumper 110, and enable the first upper restricting portions 50 restricting the position of the bumper 110 in the attachment direction to be suppressed from breaking when the bumper 110 is moved in the attachment direction.

Moreover in the bumper retainers 10, due to the cantilever portions 54 of the first upper restricting portions 50 undergoing resilient deformation, the first upper restricting portions 50 are able to absorb the energy of an external shock received by the bumper 110.

Moreover, in the bumper retainers 10, as described above, due the cantilever portions 54 of the first upper restricting portions 50 undergo resilient deformation, the energy of an external shock received by the bumper 110 is absorbed. Thereby, for example, the cantilever portions 54 are able to undergo more effective resilient deformation compared to cases in which a portion supported at both ends undergoes resilient deformation.

Moreover, in cases in which the bumper 110 receives an external shock, the bumper 110 tends to move further in the attachment direction than the reference position. When the bumper 110 moves further in the attachment direction (toward the vehicle body side) than the reference position, the cantilever portions 64 of the second upper restricting portions 60 undergo resilient deformation, and the engaging claws 62 move downward while tilting (see FIG. 4B). Moreover, in cases in which a shock force on the bumper 110 is the predetermined force or greater, the bumper 110 moves even further in the attachment direction, and the cantilever portions 64 of the second upper restricting portions 60 undergo further resilient deformation. The engaging claws 62 then exit the through holes 120, engagement between the engaging claws 62 and the through holes 120 is released, and the second upper restricting portions 60 release positional restriction of the bumper 110 (see FIG. 4C).

Thus in the bumper retainers 10, due to the cantilever portions 64 of the second upper restricting portions 60 resiliently deforming, the second upper restricting portions 60 are able to absorb energy of the external shock received by the bumper 110. Moreover, in cases in which the shock force on the bumper 110 is the predetermined force or greater, the engaging claws 62 exit the through holes 120 and engagement between the engaging claws 62 and the through holes 120 is released such that the second upper restricting portions 60 release the positional restriction of the bumper 110. This thereby enables the second upper restricting portions 60 to be suppressed from breaking.

Moreover, in the bumper retainers 10, as described above, due to the cantilever portions 64 of the second upper restricting portions 60 resiliently deforming, the energy of an external shock received by the bumper 110 is absorbed. Thus, for example, the cantilever portions 64 are able to undergo more effective resilient deformation than cases in which a portion supported at both ends undergoes resilient deformation.

Moreover, in the bumper retainers 10, the projections 30b of the lower restricting portions 30 make contact with the back face 118b of the vertical face section 118 of the bumper 110 disposed at the reference position, and the lower restricting portions 30 restrict the attachment direction position of the bumper 110 disposed at the reference position (see FIG. 6A).

Furthermore, sometimes the detached bumper 110 is moved too far in the attachment direction when an operative moves the bumper 110 in the attachment direction such that the upper face section 112 of the bumper 110 is supported by the support portions 42 of the bumper retainers 10. When the bumper 110 is moved further in the attachment direction than the reference position, the lower restricting portions 30 undergo resilient deformation. Moreover, when the motive force acting on the bumper 110 is released, the lower restricting portions 30 rebound resiliently and impart a motive force on the bumper 110 so as to move the bumper 110 to the reference position. Thus in this manner a bumper can be moved to the reference position easily even in cases in which the bumper 110 has been moved further in the attachment direction than the reference position.

Moreover, in the bumper retainers 10, the lower restricting portions 30 are connected at both ends to the body section 20 and are formed in a wavy shape undulating in the detachment direction. Due to having such a wavy shape, the lower restricting portions 30 are able to undergo resilient deformation by changing in amplitude under input of external force (see FIG. 6B).

Moreover, in the bumper retainers 10, each of the lower restricting portions 30 includes the three projections 30a, 30b, 30c, with the projection 30b interposed in the bumper width direction between the projection 30a and the projection 30c and projecting out further in the detachment direction than the projections 30a, 30c. Thus when the bumper 110 disposed at the reference position is moved in the attachment direction, the projections 30b of the lower restricting portions 30 are pressed by the bumper 110, and the projections 30a, 30c are squashed in the bumper front-rear direction and respectively tilt toward the projections 30b side (see FIG. 6B). In this manner the lower restricting portions 30 are able to resiliently deform in a state in which spreading out wider in the bumper width direction is suppressed.

Moreover, in the bumper retainers 10 a support portion 42, a first upper restricting portion 50, a support portion 42, a second upper restricting portion 60, a support portion 42, a first upper restricting portion 50, and a support portion 42 are arranged side-by-side in this sequence along the bumper width direction (see FIG. 2). Due to being arranged side-by-side in this sequence, the vertical direction position of the upper face section 112 of the portion making contact with the contact portions 52 and the first upper restricting portions 50 can be suppressed from varying. Furthermore, due to being arranged side-by-side in this manner, the vertical direction position of the upper face section 112 of the portion making contact with the engaging claws 62 of the second upper restricting portions 60 can be suppressed from varying.

Moreover, in the bumper retainers 10 the second upper restricting portions 60 are interposed in the bumper width direction between a pair of the first upper restricting portions 50. Due to such an arrangement, the end face 114a of the bumper 110 can be suppressed from being angled with respect to the design aims when viewed from above.

Moreover, in the bumper retainers 10, there are plural of the support portions 42 provided, with the support portions 42 separated from each other in the bumper width direction. The enables easy adjustment (tuning) of the shape of the support portions 42 to change the degree of contact between the support portions 42 and the back face 112b.

Moreover, in the bumper retainers 10, the upper end face 42a of the support portions 42 extends in the bumper front-rear direction. Thus when an operative moves the bumper 110 in the attachment direction, movement of the bumper 110 can be suppressed from being impeded by the support portions 42.

Second Exemplary Embodiment

Description follows regarding an example of a bumper retainer 210 according to a second exemplary embodiment of the present disclosure, with reference to FIG. 12A to FIG. 12C, FIG. 13A and FIG. 13B. Note that description regarding the second exemplary embodiment will focus on portions thereof that differ from the first exemplary embodiment.

Lower Restricting Portions 230

The bumper retainer 210 according to the second exemplary embodiment of the present disclosure is provided with lower restricting portions 230 instead of the lower restricting portions 30. As illustrated in FIG. 13A, the lower restricting portions 230 are L-shaped including bent portions 230a as viewed along the bumper vertical direction.

The bent portions 230a of the lower restricting portions 230 are formed at the front ends of the lower restricting portions 230, and the bent portions 230a make contact with the back face 118b of the vertical face section 118 of the bumper 110 disposed at the reference position. In other words, in a state not loaded with external force (unloaded state) the bent portions 230a of the lower restricting portions 230 make contact with the back face 118b of the vertical face section 118 of the bumper 110 disposed at the reference position. The lower restricting portions 230 are connected at one end to the partition portions 24 of the body section 20. In this manner the lower restricting portions 230 are supported by the body section 20 in a cantilevered state.

First Upper Restricting Portions 250

Figure 12A:
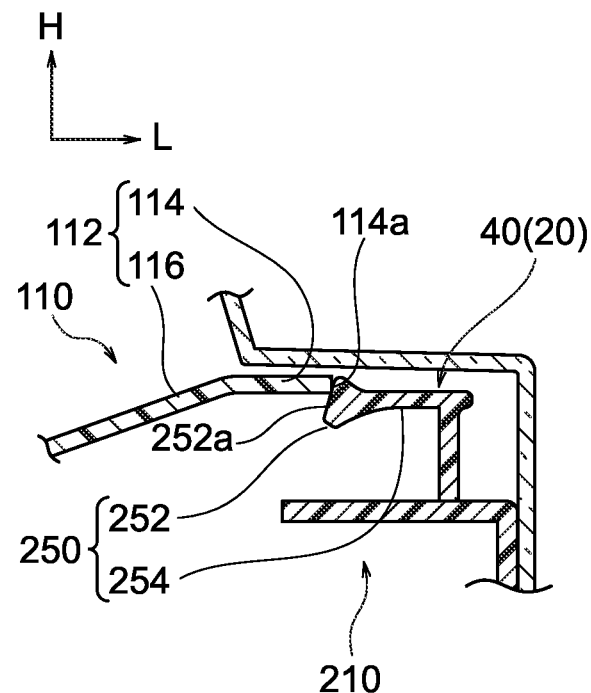
FIG. 12A is a state diagram illustrating a state of a first restricting portion provided to a bumper attachment retainer according to a second exemplary embodiment of the present disclosure.

The bumper retainer 210 according to the second exemplary embodiment is provided with first upper restricting portions 250 instead of the first upper restricting portions 50. As illustrated in FIG. 12A, each of the first upper restricting portions 250 includes a contact portion 252 that makes contact with the end face 114a of the flange section 114, and a cantilever portion 254 having a cantilevered shape that has one end connected to the contact portion 252 and another end connected to the opposing section 40 of the body section 20.

A contact face 252a is formed to the contact portion 252 and makes contact with the end face 114a of the flange section 114. The contact face 252a faces diagonally upward with respect to the detachment direction.

The cantilever portion 254 extends along the detachment direction, with the contact portion 252 connected to the front end of the cantilever portion 254 and the opposing section 40 of the body section 20 connected to the rear end of the cantilever portion 254.

Operation

Next, description follows regarding the operation and the like of the bumper retainers 210.

An operative moves the bumper 110, which is detached from the vehicle body, in the attachment direction, and the upper face section 112 of the bumper 110 is supported from below by the support portions 42 of the bumper retainers 10. The bumper 110 is thereby disposed at the reference position.

As illustrated in FIG. 13A, in a state in which the bumper 110 is disposed at the reference position, the bent portions 230a of the lower restricting portions 230 make contact in the detachment direction with the back face 118b of the vertical face section 118 of the bumper 110.

Moreover as illustrated in FIG. 12A, from a state in which the bumper 110 is disposed at the reference position, the contact faces 252a of the contact portions 252 of the first upper restricting portions 250 make contact in the detachment direction with the end face 114a of the flange section 114.

Next, description follows regarding a case in which an operative moves the bumper 110, which is detached from the vehicle body, too far when moving the bumper 110 in the attachment direction. In other words, this describes a case in which the bumper 110 has been moved further in the attachment direction than the reference position.

Figure 13B:
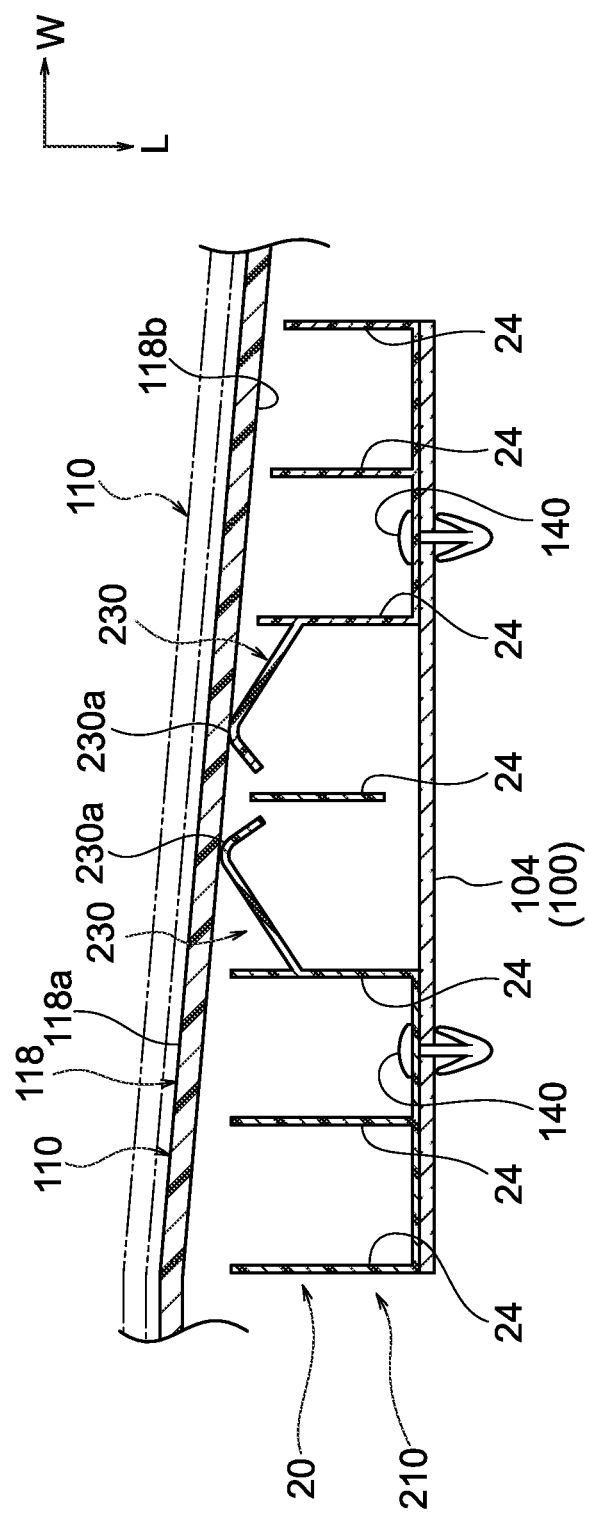
FIG. 13B is a state diagram illustrating a state of a lower restricting portion provided to a bumper attachment retainer according to the second exemplary embodiment of the present disclosure.

When the bumper 110 is moved further in the attachment direction than the reference position, as illustrated in FIG. 13B, the bent portions 230a of the lower restricting portions 230 are pressed by the bumper 110 in the attachment direction, and the lower restricting portions 230 undergo resilient deformation. Specifically, the lower restricting portions 230 flex about their supported ends due to the bent portions 230a being pressed in the attachment direction. The lower restricting portions 230 of a cantilevered shape thereby undergo resilient deformation.

Figure 12B:
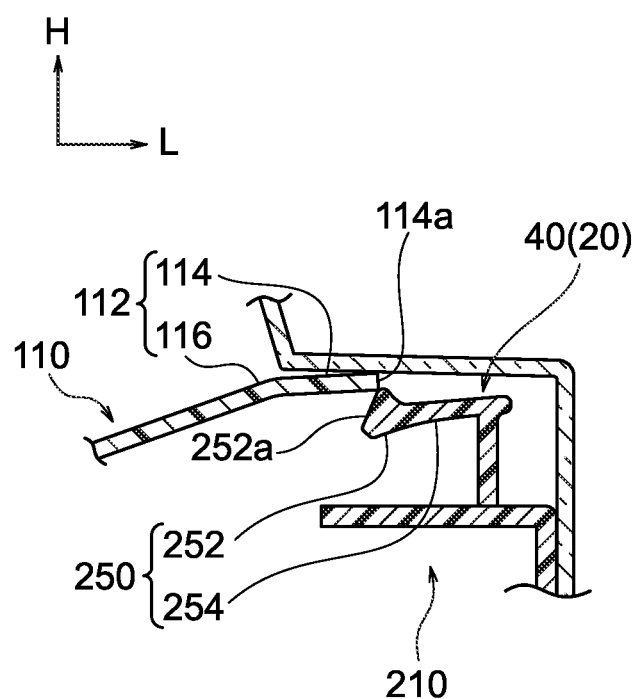
FIG. 12B is a state diagram illustrating a state of a first restricting portion provided to a bumper attachment retainer according to the second exemplary embodiment of the present disclosure.

Moreover, when the bumper 110 moves further in the attachment direction than the reference position, as illustrated in FIG. 12B, the cantilever portions 254 of the first upper restricting portions 250 undergo resilient deformation, and the contact portions 252 move downward while tilting.

Furthermore, when the operative releases force that was moving the bumper 110 in the attachment direction, the lower restricting portions 230 rebound resiliently. The resiliently rebounding lower restricting portions 230 impart the bumper 110 with motive force to move the bumper 110 to the reference position.

By the bumper 110 moving to the reference position, the cantilever portions 254 of the first upper restricting portions 250 rebound resiliently, and the contact faces 252a of the contact portions 252 make contact with the end face 114a of the flange section 114, as illustrated in FIG. 12A.

Next, description follows regarding a case in which the bumper 110 disposed at the reference position receives an external shock.

In cases in which the bumper 110 receives an external shock, the bumper 110 is moved further in the attachment direction than the reference position. When the bumper 110 moves further in the attachment direction than the reference position, as illustrated in FIG. 12B, the cantilever portions 254 of the first upper restricting portions 250 undergo resilient deformation, and the contact portions 252 move downward while tilting. Due to the cantilever portions 254 undergo resilient deformation, the first upper restricting portions 250 absorb energy of an external shock received by the bumper 110.

Figure 12C:
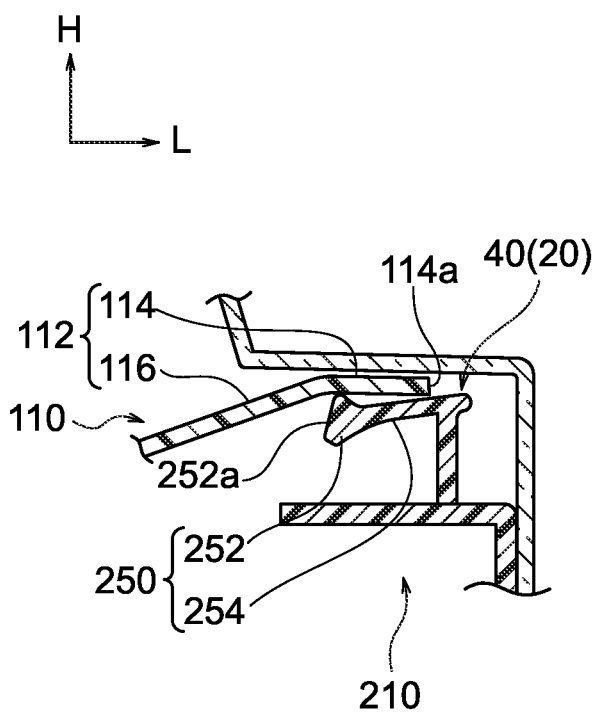
FIG. 12C is a state diagram illustrating a state of a first restricting portion provided to a bumper attachment retainer according to the second exemplary embodiment of the present disclosure.

In cases in which the shock force on the bumper 110 is the predetermined force or greater, as illustrated in FIG. 12C, the bumper 110 moves further in the attachment direction, and the cantilever portions 254 of the first upper restricting portions 250 undergo further resilient deformation. The contact faces 252a of the contact portions 252 then separate from the end face 114a, and the first upper restricting portions 250 release positional restriction of the bumper 110.

Advantageous Effects

As described above, in the bumper retainers 210 the contact faces 252a of the contact portions 252 of the first upper restricting portions 250 make contact with the end face 114a of the bumper 110. Thereby the first upper restricting portions 250 of the bumper retainer 210 are able to restrict the attachment direction position of the bumper 110 disposed at the reference position (see FIG. 12A).

Moreover, in cases in which the bumper 110 receives an external shock, the bumper 110 is moved further in the attachment direction than the reference position. When the bumper 110 moves further in the attachment direction (toward the vehicle body side) than the reference position, the cantilever portions 254 of the first upper restricting portions 250 undergo resilient deformation, and the contact portions 252 move downward while tilting (see FIG. 12B). Moreover, in cases in which the shock force on the bumper 110 is the predetermined force or greater, the bumper 110 moves even further in the attachment direction, and the cantilever portions 254 of the first upper restricting portions 250 undergo further resilient deformation. The contact faces 252a of the contact portions 252 then separate from the end face 114a, and the first upper restricting portions 250 release positional restriction of the bumper 110 (see FIG. 12C).

Due to the cantilever portions 254 of the first upper restricting portions 250 resiliently deforming in this manner the first upper restricting portions 250 are able to absorb energy of the external shock received by the bumper 110. Moreover, in cases in which the shock force on the bumper 110 is the predetermined force or greater, the contact faces 252a of the contact portions 252 separate from the end face 114a, and the first upper restricting portions 250 release positional restriction of the bumper 110. This thereby enables the first upper restricting portions 250 to be suppressed from breaking.

In the bumper retainers 210, as stated above, energy of the external shock received by the bumper 110 is absorbed by resilient deformation of the cantilever portions 254 of the first upper restricting portions 250. Thereby, for example, the cantilever portions 254 are able to resiliently deform more effectively than in cases in which a portion supported at two ends resiliently deforms.

Moreover, in the bumper retainers 210, the bent portions 230a of the lower restricting portions 230 make contact with the back face 118b of the vertical face section 118 of the bumper 110 disposed at the reference position, and the lower restricting portions 230 restrict the attachment direction position of the bumper 110 disposed at the reference position (see FIG. 13A). Furthermore, sometimes the bumper 110, which is detached from the vehicle body, is moved too far in the attachment direction when an operative moves the bumper 110 in the attachment direction. When the bumper 110 disposed at the reference position is moved in the attachment direction, the lower restricting portions 230 undergo resilient deformation. Moreover, when the motive force acting on the bumper 110 is released, the lower restricting portions 230 rebound resiliently and impart a motive force on the bumper 110 so as to move the bumper 110 to the reference position.

In this manner the resiliently deformed lower restricting portions 230 are able, by rebounding resiliently, to easily move the bumper 110 to the reference position even in cases in which the bumper 110 has been moved too far in the attachment direction.

Note that although detailed description has been given regarding specific exemplary embodiments of the present disclosure, the present disclosure is not limited by such exemplary embodiments, and it will be clear to a person of ordinary skill in the art that various other embodiments are implementable within a range of the present disclosure. For example, although in the exemplary embodiment described above the bumper retainers 10, 210 are employed to support a front bumper 110, they may also be employed to support a rear bumper.

Moreover, although in the exemplary embodiment described above the bumper retainers 10, 210 are employed to support portions at both ends of the bumper 110 in the bumper width direction, they may also be employed to support a portion toward the center of the bumper 110.

Moreover, although in the exemplary embodiment described above the cantilever portions 54, 64, 254 extend along the bumper front-rear direction, they may extend along the bumper vertical direction. The cantilever portions may flex to absorb energy of the external shock received by the bumper 110.

Moreover, although in the exemplary embodiment described above the cantilever portions 54, 64, 254, which undergo resilient deformation to absorb the energy of the external shock received by the bumper 110 by flexing, have a cantilevered shape, they may, for example, be supported at both ends. It is sufficient for the cantilever portions 54, 64, 254 to undergo resilient deformation to absorb the external shock received by the bumper 110 by flexing. However, in such cases, advantageous effects due to having a cantilevered shape are no longer exhibited.

The following supplements are further disclosed in relation to the above exemplary embodiments.

Supplement 1

A bumper attachment retainer including:
  a support portion configured to support, from a back face of a bumper, an upper face section of the bumper at which an upper face of the bumper is formed, the bumper having a U-shaped cross-section;
  a first upper restricting portion configured to make contact with the upper face section of the bumper, which is disposed at a reference position with the upper face section supported by the support portion, to restrict a position of the bumper in an attachment direction, and to release positional restriction of the bumper in a case in which a motive force in the attachment direction acting on the bumper disposed at the reference position is a predetermined force or greater; and
  a second upper restricting portion configured to make contact with the upper face section of the bumper disposed at the reference position and to restrict a position of the bumper in a detachment direction.

According to the above configuration, the first upper restricting portion makes contact with the upper face section of the bumper disposed at the reference position with the upper face section supported by the support portion, and restricts the position of the bumper in the attachment direction. Furthermore, the second upper restricting portion makes contact with the upper face section of the bumper disposed at the reference position, and restricts the position of the bumper in the detachment direction.

Thus when, for example, the bumper disposed at the reference position receives an external shock, the bumper disposed at the reference position moves in the attachment direction. Then in cases in which the motive force acting in the attachment direction on the bumper disposed at the reference position is a predetermined force or greater, the first upper restricting portion releases positional restriction of the bumper. In this manner, due to the first upper restricting portion releasing positional restriction of the bumper in cases in which the motive force acting in the attachment direction on the bumper disposed at the reference position is a predetermined force or greater, the first upper restricting portion can be suppressed from breaking.

Thus the bumper attachment retainer is, without employing a fastener, still able to restrict the position of the bumper in both the attachment direction and the detachment direction of the bumper, and to suppress the first upper restricting portion that are restricting the position of the bumper in the attachment direction from breaking.

Supplement 2

The bumper attachment retainer of Supplement 1, wherein:
  the first upper restricting portion includes a contact portion configured to make contact with an end face facing in the attachment direction of the upper face section; and
  the first upper restricting portion resiliently deforms when the bumper disposed at the reference position is moved in the attachment direction, and in a case in which a motive force acting on the bumper is a predetermined force or greater, the contact portion separates from the end face and the first upper restricting portion releases the positional restriction of the bumper.

According to the above configuration, the contact portion of the first upper restricting portion contact and end face facing in the attachment direction of the upper face section of the bumper, and the first upper restricting portion restricts the position of the bumper in the attachment direction.

For example, when the bumper disposed at the reference position receives an external shock, the bumper disposed at the reference position moves in the attachment direction. When the bumper moves in the attachment direction, the contact portion is pressed in the attachment direction, and the first upper restricting portion resiliently deforms. Furthermore, in cases in which the motive force acting on the bumper is the predetermined force or greater, the contact portion separates from the end face, and the first upper restricting portion releases positional restriction of the bumper.

In this manner, when the bumper moves in the attachment direction, the contact portion is pressed in the attachment direction, and the first upper restricting portion resiliently deforms. Furthermore, in cases in which the motive force acting on the bumper is the predetermined force or greater, the contact portion of the first upper restricting portion separates from the end face of the bumper.

The first upper restricting portion is thereby able to absorb energy of the shock received by the bumper, and the first upper restricting portion can be suppressed from breaking.

Supplement 3

The bumper attachment retainer of Supplement 2, wherein the first upper restricting portion includes a cantilever portion that extends in the attachment direction with one end connected to the contact portion.

According to the above configuration, when the bumper disposed at the reference position is moved in the attachment direction, the cantilever portion extending in the attachment direction undergoes resilient deformation by flexing.

Thus, for example, the cantilever portion is able to resiliently deform more effectively than cases in which a portion supported at both ends resiliently deforms.

Supplement 4

The bumper attachment retainer of any one of Supplement 1 to Supplement 3, wherein:
 the bumper attachment retainer further comprises a lower restricting portion configured to make contact with a back face of a vertical face section at which a vertical face of the bumper is formed and to restrict the position of the bumper in the attachment direction; and
 the lower restricting portion is configured to undergo resilient deformation when the bumper disposed at the reference position moves in the attachment direction, and the lower restricting portion is configured to rebound resiliently when motive force acting on the bumper is released and impart the bumper with motive force to move to the reference position.

According to the above configuration, the lower restricting portion contacting the back face of the vertical face section of the bumper resiliently deforms when the bumper disposed at the reference position moves in the attachment direction. Furthermore, when the motive force acting on the bumper is released, the lower restricting portion rebounds resiliently and imparts the bumper with motive force to move to the reference position.

Thereby the bumper can easily be moved to the reference position even in cases in which the bumper disposed at the reference position has been moved in the attachment direction.

Supplement 5

The bumper attachment retainer of Supplement 4, wherein the lower restricting portion has a wavy shape undulating in the detachment direction.

According to the above configuration, the lower restricting portion has a wavy shape undulating in the detachment direction. In this manner, due to having a wavy shape the lower restricting portion is able to resiliently deform by changing amplitude in cases in which the bumper disposed at the reference position is moved in the attachment direction.

Supplement 6

The bumper attachment retainer of any one of Supplement 1 to Supplement 5, wherein:
 the second upper restricting portion includes an engaging claw configured to be inserted into, and engage with, a through hole formed penetrating the upper face section in a vertical direction; and
 the second upper restricting portion undergoes resilient deformation when the bumper disposed at the reference position moves in the attachment direction, and in a case in which a motive force acting on the bumper is a predetermined force or greater, engagement between the engaging claw and the through hole is released, and the second upper restricting portion releases positional restriction of the bumper.

According to the above configuration, the engaging claw of the second upper restricting portion is inserted into a through hole in the upper face section of the bumper disposed at the reference position and engages with the through hole.

For example, when the bumper disposed at the reference position receives an external shock, the bumper disposed at the reference position moves in the attachment direction. When the bumper moves in the attachment direction, the second upper restricting portion undergoes resilient deformation. Furthermore, in cases in which the motive force acting on the bumper is the predetermined force or greater, the engaging claw exits the through hole, engagement with the through hole is released, and the second upper restricting portion releases positional restriction of the bumper.

The second upper restricting portion accordingly resiliently deforms when the bumper moves in the attachment direction. Furthermore, in cases in which the motive force acting on the bumper is the predetermined force or greater, the engaging claw exits the through hole and engagement with the through hole is released.

Due to this the second upper restricting portion is able to absorb energy of a shock received by the bumper, and the second upper restricting portion is able to be suppressed from breaking.

Supplement 7

The bumper attachment retainer of Supplement 6, wherein the second upper restricting portion includes a second cantilever portion that extends in the detachment direction with one end connected to the engaging claw.

According to the above configuration, the second cantilever portion extending in the detachment direction undergoes resilient deformation by flexing when the bumper disposed in the reference position moves in the attachment direction.

Therefore, for example, the second cantilever portion is able to resiliently deform more effectively than in cases in which a portion supported at two ends resiliently deforms.

The entire content of the disclosure of Japanese Patent Application No. 2019-101503 filed on May 30, 2019 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A bumper attachment retainer, comprising:
 a support portion configured to support, from a back face of a bumper, an upper face section of the bumper at which an upper face of the bumper is formed, the bumper having a U-shaped cross-section;
 a first upper restricting portion configured to make contact with the upper face section of the bumper, which is disposed at a reference position with the upper face section supported by the support portion, to restrict a position of the bumper in an attachment direction, and to release positional restriction of the bumper in a case in which a motive force in the attachment direction acting on the bumper disposed at the reference position is a predetermined force or greater; and
 a second upper restricting portion configured to make contact with the upper face section of the bumper disposed at the reference position and to restrict a position of the bumper in a detachment direction that is a direction opposite to the attachment direction, wherein:

the first upper restricting portion includes a contact portion configured to make contact with an end face facing in the attachment direction of the upper face section, and a first cantilever portion that extends in the attachment direction with one end in the attachment direction connected to the contact portion;

the contact portion is formed of a portion protruding upward from the one end in the attachment direction, which is a free end, of the first cantilever portion;

the first cantilever portion resiliently deforms when the bumper disposed at the reference position is moved in the attachment direction, and in a case in which a motive force acting on the bumper is a predetermined force or greater, the contact portion separates from the end face and the first upper restricting portion releases the positional restriction of the bumper;

the second upper restricting portion includes an engaging claw configured to be inserted into, and engage with, a through hole formed penetrating the upper face section in a vertical direction, and a second cantilever portion that extends in the detachment direction with one end in the detachment direction connected to the engaging claw;

the engaging claw is formed of a portion protruding upward from the one end in the detachment direction, which is a free end, of the second cantilever portion; and the second cantilever portion undergoes resilient deformation when the bumper disposed at the reference position moves in the attachment direction, and in a case in which a motive force acting on the bumper is a predetermined force or greater, engagement between the engaging claw and the through hole is released, and the second upper restricting portion releases positional restriction of the bumper.

2. The bumper attachment retainer of claim 1, wherein:

the bumper attachment retainer further comprises a lower restricting portion configured to make contact with a back face of a vertical face section at which a vertical face of the bumper is formed and to restrict the position of the bumper in the attachment direction; and the lower restricting portion is configured to undergo resilient deformation when the bumper disposed at the reference position moves in the attachment direction, and the lower restricting portion is configured to rebound resiliently when motive force acting on the bumper is released and impart the bumper with motive force to move to the reference position.

3. The bumper attachment retainer of claim 2, wherein the lower restricting portion has a wavy shape undulating in the detachment direction.

* * * * *